US010776302B2

(12) United States Patent
Hor et al.

(10) Patent No.: US 10,776,302 B2
(45) Date of Patent: Sep. 15, 2020

(54) VIRTUALIZED LINK STATES OF MULTIPLE PROTOCOL LAYER PACKAGE INTERCONNECTS

(71) Applicant: Intel Corporation, Santa Clara, CA (US)

(72) Inventors: Joon Teik Hor, Bayan Lepas (MY); Ting Lok Song, Bayan Lepas (MY); Mahesh Wagh, Portland, OR (US); Su Wei Lim, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/373,472

(22) Filed: Apr. 2, 2019

(65) Prior Publication Data

US 2019/0227972 A1   Jul. 25, 2019

(51) Int. Cl.
*G06F 13/40* (2006.01)
*G06F 13/38* (2006.01)
*G06F 13/42* (2006.01)
*G06F 13/16* (2006.01)

(52) U.S. Cl.
CPC ...... *G06F 13/4031* (2013.01); *G06F 13/1652* (2013.01); *G06F 13/387* (2013.01); *G06F 13/4208* (2013.01)

(58) Field of Classification Search
CPC .......................... G06F 13/4031; G06F 13/387
See application file for complete search history.

(56) References Cited

U.S. PATENT DOCUMENTS

| 2015/0103677 | A1* | 4/2015 | Lee ................... H04L 41/0896 370/249 |
| 2016/0179427 | A1 | 6/2016 | Jen et al. |
| 2018/0095923 | A1 | 4/2018 | Iyer et al. |
| 2019/0102292 | A1* | 4/2019 | Agarwal ............... G06F 12/06 |

OTHER PUBLICATIONS

EPO; Extended European Search Report issued for EP Patent Application No. 20156893.8; dated May 15, 2020; 8 pages.

* cited by examiner

*Primary Examiner* — Glenn A. Auve
(74) *Attorney, Agent, or Firm* — Alliance IP, LLC

(57) ABSTRACT

Systems, methods, and devices can include a first die comprising a first arbitration and multiplexing logic, a first protocol stack associated with a first interconnect protocol, and a second protocol stack associated with a second interconnect protocol. A second die comprising a second arbitration and multiplexing logic. A multilane link connects the first die to the second die. The second arbitration and multiplexing logic can send a request to the first arbitration and multiplexing logic to change a first virtual link state associated with the first protocol stack. The first arbitration and multiplexing logic can receive, from across the multilane link, the request from the first die indicating a request to change the first virtual link state; determine that the first interconnect protocol is ready to change a physical link state; and change the first virtual link state according to the received request while maintaining a second virtual link state.

24 Claims, 16 Drawing Sheets

VIRTUALIZED LINK STATES OF MULTIPLE PROTOCOL LAYER PACKAGE INTERCONNECTS

BACKGROUND

Interconnects can be used to provide communication between different devices within a system, some type of interconnect mechanism is used. One typical communication protocol for communications interconnects between devices in a computer system is a Peripheral Component Interconnect Express (PCI Express™ (PCIe™)) communication protocol. This communication protocol is one example of a load/store input/output (I/O) interconnect system. The communication between the devices is typically performed serially according to this protocol at very high speeds.

Devices can be connected across various numbers of data links, each data link including a plurality of data lanes. Upstream devices and downstream devices undergo link training upon initialization to optimize data transmissions across the various links and lanes.

DETAILED DESCRIPTION

Figure 1:
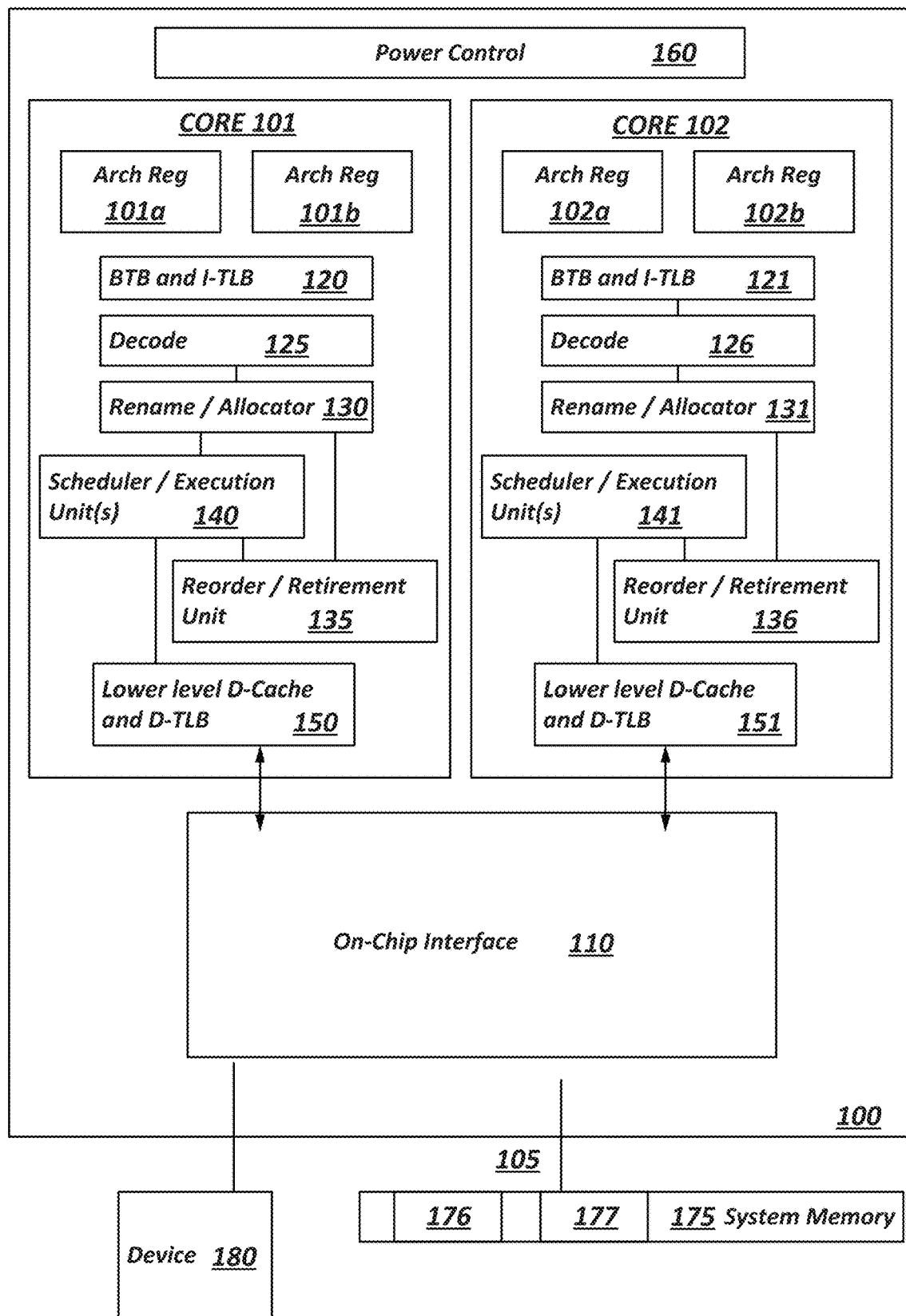
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

As process technology development becomes more and more complex, Multi-Chip Package (MCP) technology, whereby a collection of multiple smaller dies are connected to each other, becomes increasingly prevalent. Multiple protocol layers in these smaller dies can be time multiplexed and connected with each other using a single on-package interconnect (e.g. Rosetta-Link (or R-Link) technology). In general, a protocol link layer can have control of its own link states. However, these multiple protocol layers which tunnel through the same on-package interconnect can be agnostic to each other, which creates a contention between these multiple protocol layers on who is in control of the link state. This disclosure described systems, methods, and apparatuses to resolve contentions between multiple protocol layers.

This disclosure describes a method to virtualize the link states of each protocol layer that share the same on-package interconnect. The virtualization of link states allows the protocol layers (both software and hardware) to appear as if they have ownership of the link states.

With the wider adoption of die-to-die interconnect technology, the ability to not only tunnel multiple protocols over the interconnect, but also having a method to virtualize each protocols link states can be beneficial from power efficiency and ease of adoption perspective.

Figure 2:
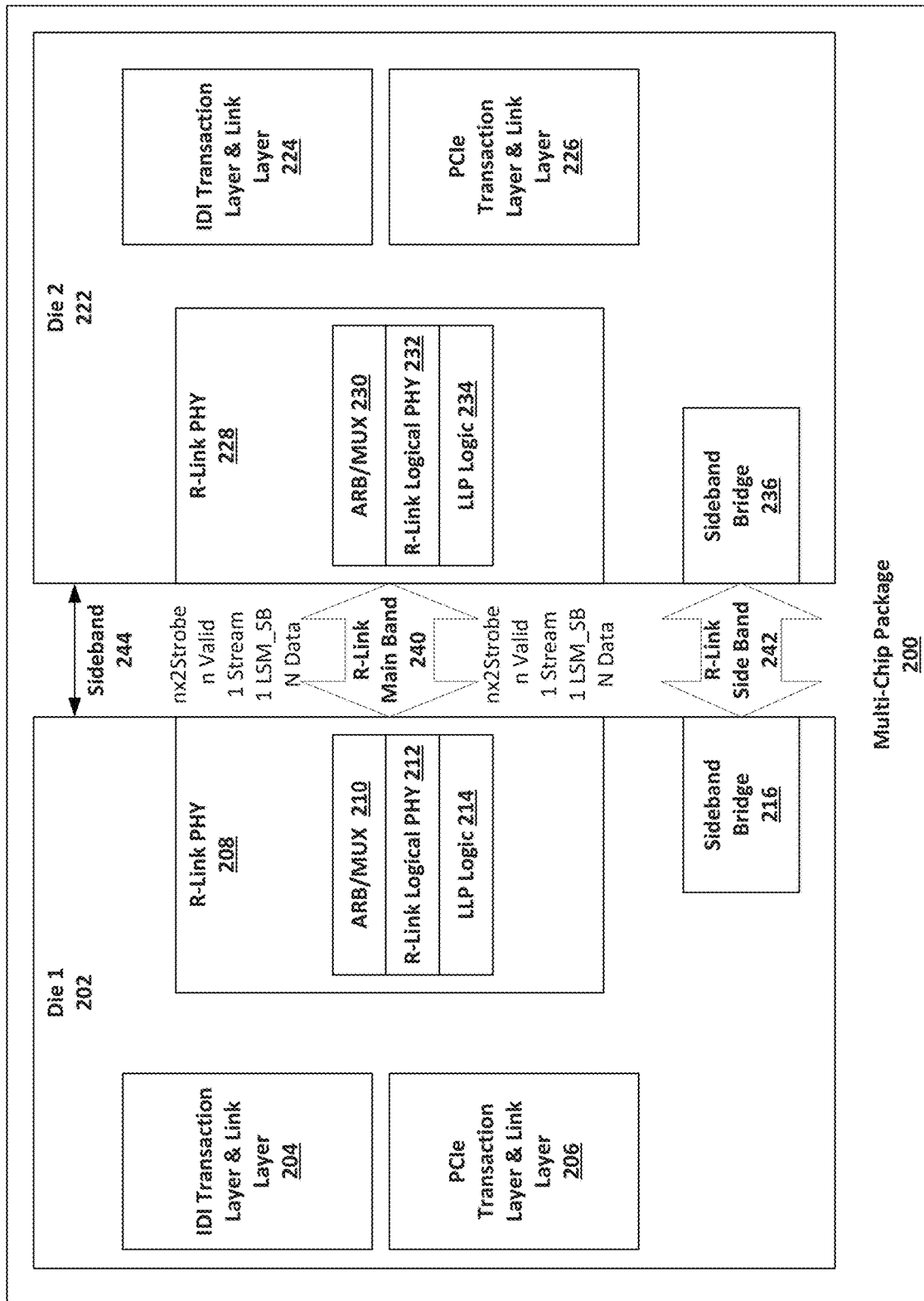
FIG. 2 is a schematic diagram of an example R-Link interconnecting two dies in accordance with embodiments of the present disclosure.

FIG. 2 is a schematic diagram of an example R-Link interconnecting two dies in accordance with embodiments of the present disclosure. Turning to FIG. 2, a simplified block diagram 200 is shown representing at least a portion of a system including an example implementation of a multichip package link (MCPL). An MCPL can be implemented using physical electrical connections (e.g., wires implemented as lanes) connecting a first device 202 (e.g., a first die including one or more sub-components) with a second device 222 (e.g., a second die including one or more other sub-components). In the particular example shown in the high-level representation of diagram 200, all signals (in channels 240, 242) can be unidirectional and lanes can be provided for the data signals to have both an upstream and downstream data transfer.

In one example implementation, an MCPL can provide a physical layer (PHY) including the electrical MCPL PHY 208, 228 and executable logic implementing MCPL logical PHY 212, 232. Electrical, or physical, PHY 208, 228 can provide the physical connection over which data is communicated between devices 202, 222. Signal conditioning components and logic can be implemented in connection with the physical PHY 208, 228 in order to establish high data rate and channel configuration capabilities of the link, which in some applications can involve tightly clustered physical connections at lengths of approximately 45 mm or more. The logical PHY 212, 232 can include logic for facilitating clocking, link state management (e.g., for link layers 204, 206, 224, 226), and protocol multiplexing between potentially multiple, different protocols used for communications over the MCPL.

In one example implementation, physical PHY 208, 228 can include, for each channel (e.g., 240, 242) a set of data lanes, over which in-band data can be sent. In this particular example, 50 data lanes are provided in each of the upstream and downstream channels 240, 242, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 244, which, in some examples, can be a bi-directional lower frequency control signal link used to coordinate state transitions and other attributes of the MCPL connecting devices 202, 222 among other examples.

As noted above, multiple protocols can be supported using an implementation of MCPL. Indeed, multiple, independent transaction layers and link layers 204, 206, 224, 226 can be provided at each device 202, 222. For instance, each device 202, 222 may support and utilize two or more protocols, such as PCI, PCIe, QPI, Intel In-Die Interconnect (IDI), among others. IDI is a coherent protocol used on-die to communicate between cores, Last Level Caches (LLCs), memory, graphics, and IO controllers. Other protocols can also be supported including Ethernet protocol, Infiniband protocols, and other PCIe fabric based protocols. The combination of the Logical PHY and physical PHY can also be used as a die-to-die interconnect to connect a SerDes PHY (PCIe, Ethernet, Infiniband or other high speed SerDes) on one die to its upper layers that are implemented on the other die, among other examples.

Logical PHY 212, 232 can support multiplexing between these multiple protocols on an MCPL. For instance, the dedicated stream lane can be used to assert an encoded stream signal that identifies which protocol is to apply to data sent substantially concurrently on the data lanes of the channel. Further, logical PHY 212, 232 can be used to negotiate the various types of link state transitions that the various protocols may support or request. In some instances, LSM_SB signals sent over the channel's dedicated LSM_SB lane can be used, together with side band link 244 to communicate and negotiate link state transitions between the devices 202, 222. Further, link training, error detection, skew detection, de-skewing, and other functionality of traditional interconnects can be replaced or governed, in part using logical PHY 212, 232. For instance, valid signals sent over one or more dedicated valid signal lanes in each channel can be used to signal link activity, detect skew, link errors, and realize other features, among other examples. In the particular example of FIG. 2, multiple valid lanes are provided per channel. For instance, data lanes within a channel can be bundled or clustered (physically and/or logically) and a valid lane can be provided for each cluster. Further, multiple strobe lanes can be provided, in some cases, also to provide a dedicated strobe signal for each cluster in a plurality of data lane clusters in a channel, among other examples.

As noted above, logical PHY 212, 232 can be used to negotiate and manage link control signals sent between devices connected by the MCPL. In some implementations, logical PHY 212, 232 can include link layer packet (LLP) generation logic 214, 234 that can be used to send link layer control messages over the MCPL (i.e., in band). Such messages can be sent over data lanes of the channel, with the stream lane identifying that the data is link layer-to-link layer messaging, such as link layer control data, among other examples. Link layer messages enabled using LLP module 214, 234 can assist in the negotiation and performance of link layer state transitioning, power management, loopback, disable, re-centering, scrambling, among other link layer features between the link layers 204, 206, 224, 226 of devices 202, 222 respectively.

Each device 202, 222 can include an arbitration and multiplexing logic (ARB/MUX) 210, 230, respectively. The ARB/MUX 210, 230 can be used to arbitrate between different protocols supported by the dies. The ARB/MUX 210, 230 is the logic that performs arbitration and multiplexing of multiple protocols over the R-Link interconnect.

Figure 3:
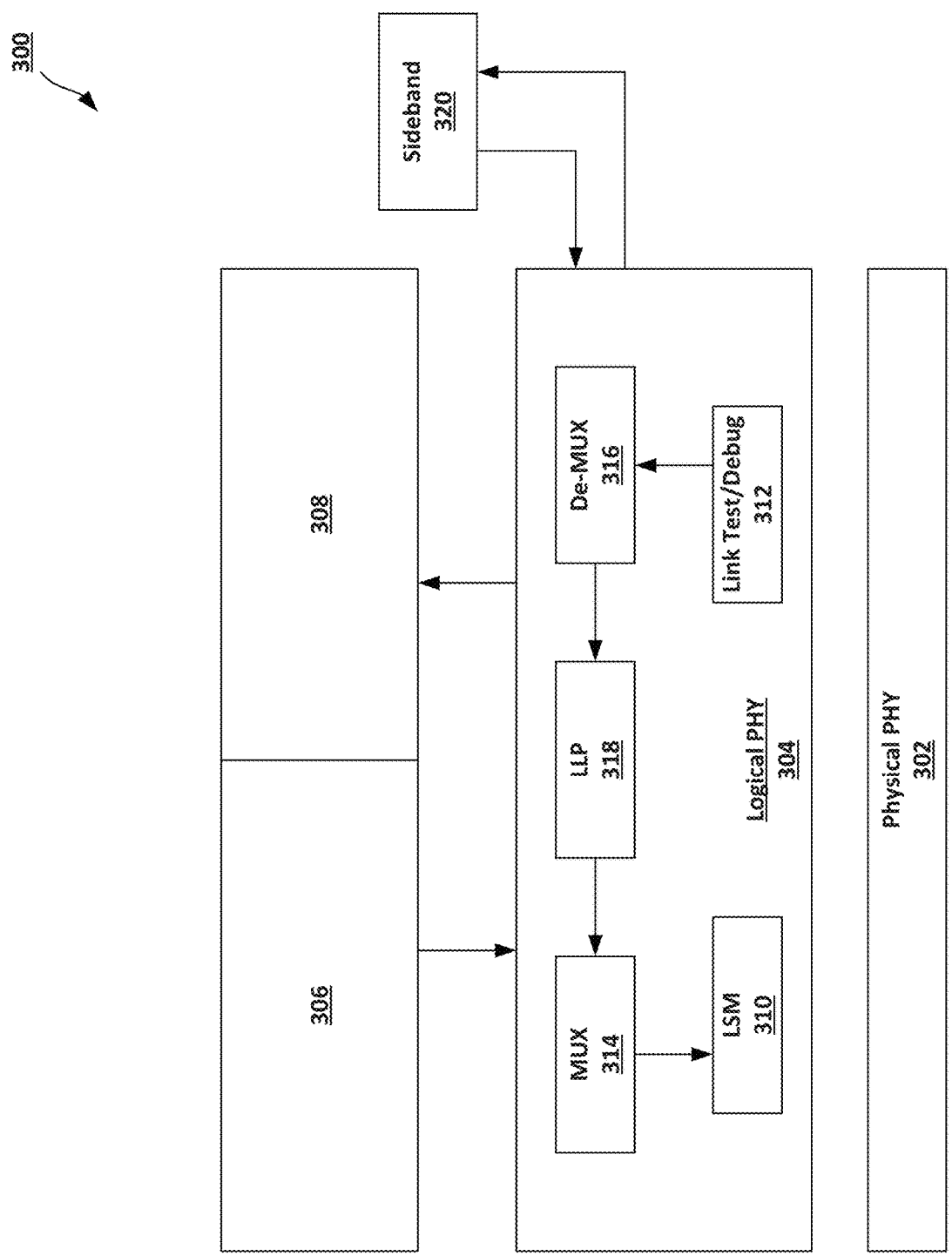
FIG. 3 is a simplified block diagram of a Multichip Package Link (MCPL) in accordance with embodiments of the present disclosure.

Turning to FIG. 3, a simplified block diagram 300 is shown illustrating an example logical PHY of an example MCPL. A physical PHY 302 can connect to a die that includes logical PHY 304 and additional logic supporting a link layer of the MCPL. The die, in this example, can further include logic to support multiple different protocols on the MCPL. For instance, in the example of FIG. 3, PCIe logic 306 can be provided as well as in-die interconnect (IDI) logic 308, such that the dies can communicate using either PCIe or IDI over the same MCPL connecting the two dies, among potentially many other examples, including examples where more than two protocols or protocols other than PCIe and IDI are supported over the MCPL. Various protocols supported between the dies can offer varying levels of service and features.

Logical PHY 304 can include link state machine (LSM) management logic 310 for negotiating link state transitions in connection with requests of upper layer logic of the die (e.g., received over PCIe or IDI). Logical PHY 304 can further include link testing and debug logic (e.g., 312) ion some implementations. As noted above, an example MCPL can support control signals that are sent between dies over the MCPL to facilitate protocol agnostic, high performance, and power efficiency features (among other example features) of the MCPL. For instance, logical PHY 310 can support the generation and sending, as well as the receiving and processing of valid signals, stream signals, and LSM sideband signals in connection with the sending and receiving of data over dedicated data lanes, such as described in examples above.

In some implementations, multiplexing (e.g., 314) and demultiplexing (e.g., 316) logic can be included in, or be otherwise accessible to, logical PHY 310. For instance, multiplexing logic (e.g., 314) can be used to identify data (e.g., embodied as packets, messages, etc.) that is to be sent out onto the MCPL. The multiplexing logic 314 can identify the protocol governing the data and generate a stream signal that is encoded to identify the protocol. For instance, in one example implementation, the stream signal can be encoded as a byte of two hexadecimal symbols (e.g., IDI: FFh; PCIe: F0h; LLP: AAh; sideband: 55h; etc.), and can be sent during the same window (e.g., a byte time period window) of the data governed by the identified protocol. Similarly, demultiplexing logic 316 can be employed to interpret incoming stream signals to decode the stream signal and identify the protocol that is to apply to data concurrently received with the stream signal on the data lanes. The demultiplexing logic 316 can then apply (or ensure) protocol-specific link layer handling and cause the data to be handled by the corresponding protocol logic (e.g., PCIe logic 306 or IDI logic 308).

Logical PHY 310 can further include link layer packet logic 318 that can be used to handle various link control functions, including power management tasks, loopback, disable, re-centering, scrambling, etc. LLP logic 318 can facilitate link layer-to-link layer messages over MCLP, among other functions. Data corresponding to the LLP signaling can be also be identified by a stream signal sent on a dedicated stream signal lane that is encoded to identify that the data lanes LLP data. Multiplexing and demultiplexing logic (e.g., 314, 316) can also be used to generate and interpret the stream signals corresponding to LLP traffic, as well as cause such traffic to be handled by the appropriate die logic (e.g., LLP logic 318). Likewise, as some implementations of an MCLP can include a dedicated sideband (e.g., sideband 320 and supporting logic), such as an asynchronous and/or lower frequency sideband channel, among other examples.

Logical PHY logic 304 can further include link state machine management logic that can generate and receive (and use) link state management messaging over a dedicated LSM sideband lane. For instance, an LSM sideband lane can be used to perform handshaking to advance link training state, exit out of power management states (e.g., an L1 state), among other potential examples. The LSM sideband signal can be an asynchronous signal, in that it is not aligned with the data, valid, and stream signals of the link, but instead corresponds to signaling state transitions and align the link state machine between the two die or chips connected by the link, among other examples. Providing a dedicated LSM sideband lane can, in some examples, allow for traditional squelch and received detect circuits of an analog front end (AFE) to be eliminated, among other example benefits.

Figure 4:
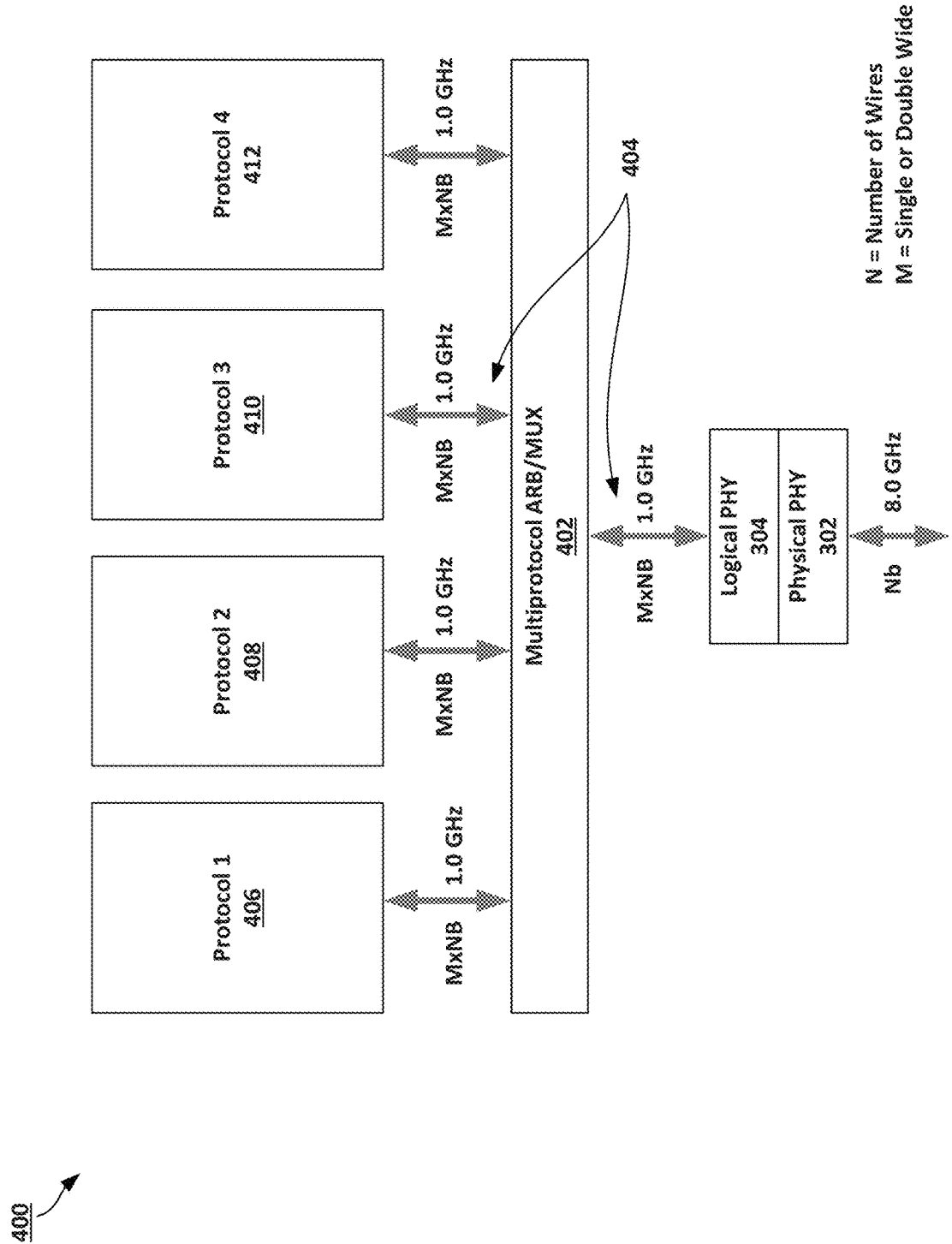
FIG. 4 is a simplified block diagram of an Multichip Package Link (MCPL) interfacing with upper layer logic of multiple protocols using a logical PHY interface (LPIF) in accordance with embodiments of the present disclosure.

Turning to FIG. 4, a simplified block diagram 400 is shown illustrating another representation of logic used to implement an MCPL. For instance, logical PHY 304 is provided with a defined logical PHY interface (LPIF) 404 through which any one of a plurality of different protocols 406, 408, 410, 412 (e.g., PCIe, IDI, QPI, etc.) and signaling modes (e.g., sideband) can interface with the physical layer of an example MCPL. In some implementations, multiplexing and arbitration logic 402 can also be provided as a layer separate from the logical PHY 310. In one example, the LPIF 404 can be provided as the interface on either side of this ARB/MUX logic 402. The logical PHY 310 can interface with the physical PHY (e.g., an analog front end (AFE)) 302 of the MCPL PHY) through another interface.

The LPIF can abstract the PHY (logical and electrical/analog) from the upper layers (e.g., 406, 408, 410, 412) such that a completely different PHY can be implemented under LPIF transparent to the upper layers. This can assist in promoting modularity and re-use in design, as the upper layers can stay intact when the underlying signaling technology PHY is updated, among other examples. Further, the LPIF can define a number of signals enabling multiplexing/demultiplexing, LSM management, error detection and handling, and other functionality of the logical PHY. For instance, Table 1 summarizes at least a portion of signals that can be defined for an example LPIF:

TABLE 1

Nonexhaustive List of Signals Defined for an Example LPIF

| Signal Name | Description |
| --- | --- |
| Rst | Reset |
| Lclk | Link Clock - 8UI of PHY clock |
| Pl_trdy | Physical Layer is ready to accept data, data is accepted by Physical layer when Pl_trdy and Lp_valid are both asserted. |
| Pl_data[N-1:0][7:0] | Physical Layer-to-Link Layer data, where N equals the number of lanes. |
| Pl_valid | Physical Layer-to-Link Layer signal indicating data valid |
| Pl_Stream[7:0] | Physical Layer-to-Link Layer signal indicating the stream ID received with received data |
| Pl_error | Physical layer detected an error (e.g., framing or training) |
| Pl_AlignReq | Physical Layer request to Link Layer to align packets at LPIF width boundary |
| Pl_in_L0 | Indicates that link state machine (LSM) is in L0 |
| Pl_in_retrain | Indicates that LSM is in Retrain/Recovery |
| Pl_rejectL1 | Indicates that the PHY layer has rejected entry into L1. |
| Pl_in_L12 | Indicates that LSM is in L1 or L2. |
| Pl_LSM (3:0) | Current LSM state information |
| Lp_data[N-1:0][7:0] | Link Layer-to-Physical Layer Data, where N equals number of lanes. |
| Lp_Stream[7:0] | Link Layer-to-Physical Layer signal indicating the stream ID to use with data |
| Lp_AlignAck | Link Layer to Physical layer indicates that the packets are aligned LPIF width boundary |
| Lp_valid | Link Layer-to-Physical Layer signal indicating data valid |
| Lp_enterL1 | Link Layer Request to Physical Layer to enter L1 |
| Lp_enterL2 | Link Layer Request to Physical Layer to enter L2 |
| Lp_Retrain | Link Layer Request to Physical Layer to Retrain the PHY |
| Lp_exitL12 | Link Layer Request to Physical Layer to exit L1, L2 |
| Lp_Disable | Link Layer Request to Physical Layer to disable PHY |

As noted in Table 1, in some implementations, an alignment mechanism can be provided through an AlignReq/AlignAck handshake. For example, when the physical layer enters recovery, some protocols may lose packet framing. Alignment of the packets can be corrected, for instance, to guarantee correct framing identification by the link layer.

Various fault tolerances can be defined for signals on the MCPL. For instance, fault tolerances can be defined for valid, stream, LSM sideband, low frequency side band, link layer packets, and other types of signals. Fault tolerances for packets, messages, and other data sent over the dedicated data lanes of the MCPL can be based on the particular protocol governing the data. In some implementations, error detection and handling mechanisms can be provided, such as cyclic redundancy check (CRC), retry buffers, among other potential examples. As examples, for PCIe packets sent over the MCPL, 32-bit CRC can be utilized for PCIe transaction layer packets (TLPs) (with guaranteed delivery (e.g., through a replay mechanism)) and 16-bit CRC can be utilized for PCIe link layer packets (which may be architected to be lossy (e.g., where replay is not applied)). Further, for PCIe framing tokens, a particular hamming distance (e.g., hamming distance of four (4)) can be defined for the token identifier; parity and 4-bit CRC can also be utilized, among other examples. For IDI packets, on the other hand, 16-bit CRC can be utilized.

In some implementations, fault tolerances can be defined for link layer packets (LLPs) that include requiring a valid signal to transition from low to high (i.e., 0-to-1) (e.g., to assist in assuring bit and symbol lock). Further, in one example, a particular number of consecutive, identical LLPs can be defined to be sent and responses can be expected to each request, with the requestor retrying after a response timeout, among other defined characteristics that can be used as the basis of determining faults in LLP data on the MCPL. In further examples, fault tolerance can be provided for a valid signal, for instance, through extending the valid signal across an entire time period window, or symbol (e.g., by keeping the valid signal high for eight UIs). Additionally, errors or faults in stream signals can be prevented by maintaining a hamming distance for encodings values of the stream signal, among other examples.

Implementations of a logical PHY can include error detection, error reporting, and error handling logic. In some implementations, a logical PHY of an example MCPL can include logic to detect PHY layer de-framing errors (e.g., on the valid and stream lanes), sideband errors (e.g., relating to LSM state transitions), errors in LLPs (e.g., that are critical to LSM state transitions), among other examples. Some error detection/resolution can be delegated to upper layer logic, such as PCIe logic adapted to detect PCIe-specific errors, among other examples.

In the case of de-framing errors, in some implementations, one or more mechanisms can be provided through error handling logic. De-framing errors can be handled based on the protocol involved. For instance, in some implementations, link layers can be informed of the error to trigger a retry. De-framing can also cause a realignment of the logical PHY de-framing. Further, re-centering of the logical PHY can be performed and symbol/window lock can be reacquired, among other techniques. Centering, in some examples, can include the PHY moving the receiver clock phase to the optimal point to detect the incoming data. "Optimal," in this context, can refer to where it has the most margin for noise and clock jitter. Re-centering can include simplified centering functions, for instance, performed when the PHY wakes up from a low power state, among other examples.

Other types of errors can involve other error handling techniques. For instance, errors detected in a sideband can be caught through a time-out mechanism of a corresponding state (e.g., of an LSM). The error can be logged and the link state machine can then be transitioned to Reset. The LSM can remain in Reset until a restart command is received from software. In another example, LLP errors, such as a link control packet error, can be handled with a time-out mechanism that can re-start the LLP sequence if an acknowledgement to the LLP sequence is not received.

Figure 5:
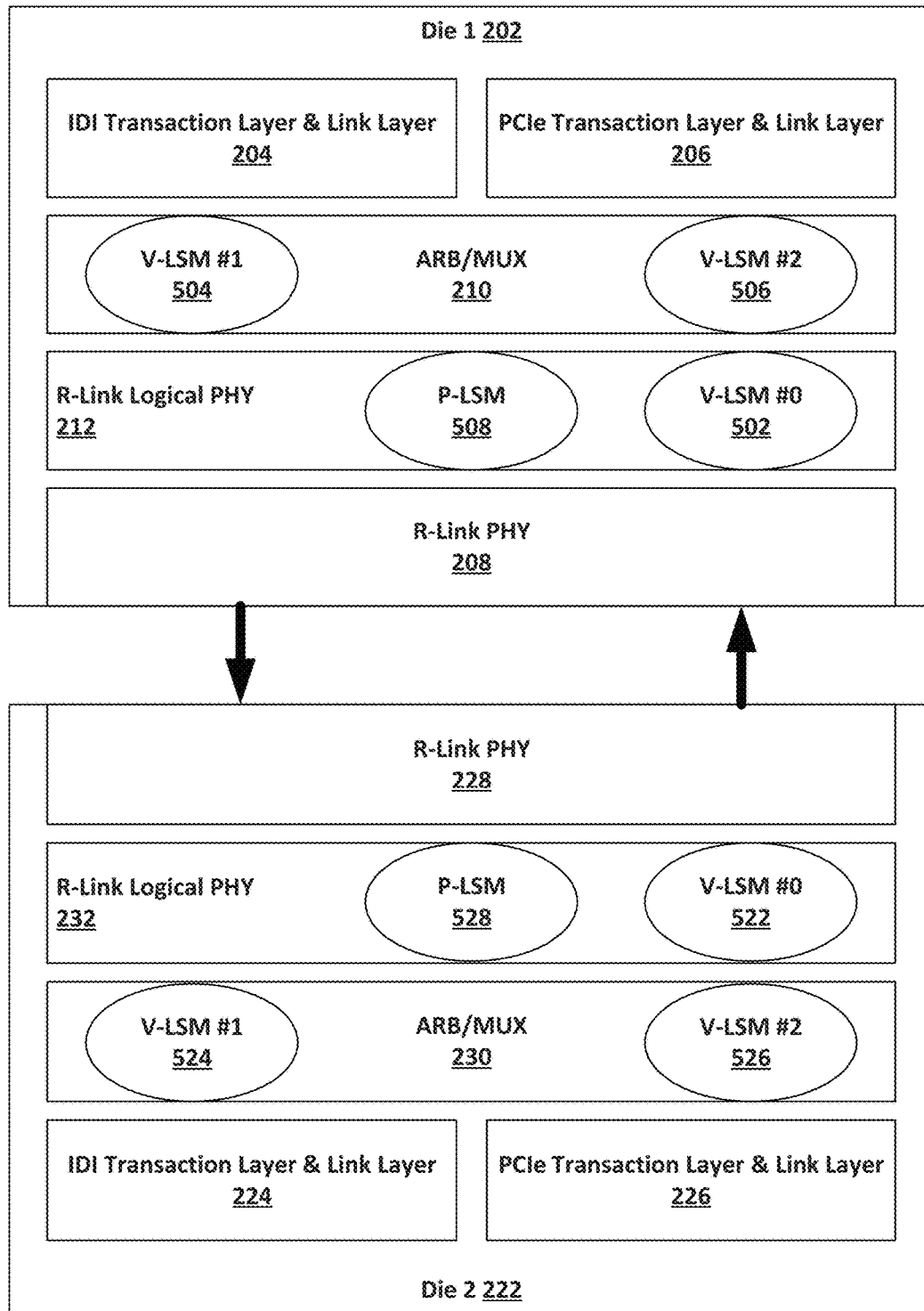
FIG. 5 is a schematic diagram illustrating a Multichip Package Link (MCPL) illustrating example locations of Physical Link State Machines and Virtual Link State Machines in accordance with embodiments of the present disclosure.

FIG. 5 is a schematic diagram illustrating a Multichip Package Link (MCPL) 500 illustrating example locations of Physical Link State Machines and Virtual Link State Machines in accordance with embodiments of the present disclosure. The MCPL 500 is similar or can have similar functionality to the structures shown in FIGS. 2-4. Device (or die) 1 202 can include two more interconnect protocol component elements, such as IDI transaction & link layer hardware and software 204 and PCIe transaction & link layer hardware and software 206. The device 1 202 can include physical PHY 208 represented by the R-link PHY 208, a logical PHY represented by R-Link Logical PHY 212, and ARB/MUX 210.

Device (or die) 2 222 can include two more interconnect protocol component elements, such as IDI transaction & link layer hardware and software 224 and PCIe transaction & link layer hardware and software 226. The device 1 222 can include physical PHY 228 represented by the R-link PHY 228, a logical PHY represented by R-Link Logical PHY 232, and ARB/MUX 230.

FIG. 5 shows locations of the Physical Link State Machine (P-LSM) 508, 528 and Virtual Link State Machine (V-LSM) within the R-Link stack. Each die can have its own sets of P-LSM and V-LSM which are a mirrored version of the opposite die. The P-LSM governs the actual physical link state and it is located in the R-Link Logical PHY. Each protocol layer can have its own link state virtualized by a V-LSM. In FIG. 5, V-LSM #0 502, 522 virtualizes the link states of the ARB-MUX protocol layer 210, 230, respectively; V-LSM #1 504, 524 virtualizes the link states of the IDI protocol layer 204, 224, respectively; and V-LSM #2 506, 526 virtualizes the link states of the PCIe protocol layer 206, 226. Listed below are examples of link states that can be virtualized:
1) Reset
2) Active (L0)
3) Idle (L1)
4) Sleep (L2)
5) Retrain/Recovery
6) Disable
7) Link Reset
8) Link Error By virtualizing the link states, this disclosure facilitates protocol layers to be agnostic to each other. Thus enabling the protocol layers' hardware or software drivers to control their own link states as if they own the link exclusively. This reduces hardware/software adoption complexity since they are shielded by the V-LSM from the need to understand the concept of shared/multiplexed link. Furthermore, by having the V-LSM, protocol layers are allowed to enter idle state (thus enabling power management features) independent of each other. Table 2 illustrates that this disclosure solution allows Protocol Layer #2 to enter "Idle" state as early as Seq#3. On the other hand, Table 3 illustrates how link state transitions without virtualization would have only allowed Protocol Layer #2 to enter "Idle" state at Seq#7 (i.e. after all protocol layers are ready to enter "Idle" state). This shows that this disclosure provides a clear benefit from power efficiency perspective.

TABLE 2

Example of how each protocol layer link states would be based on this disclosure solution

| | | Link State Machine Status | | | |
|---|---|---|---|---|---|
| Seq# | Events | V-LSM #2 | V-LSM #1 | V-LSM #0 | P-LSM |
| 1 | ... | Active | Active | Active | Active |
| 2 | Protocol Layer #2 Idle State Request | Active | Active | Active | Active |
| 3 | ... | Idle | Active | Active | Active |
| 4 | Protocol Layer #1 Idle State Request | Idle | Active | Active | Active |
| 5 | ... | Idle | Idle | Active | Active |
| 6 | ARB-MUX Layer Idle State Request | Idle | Idle | Active | Active |
| 7 | ... | Idle | Idle | Idle | Idle |

TABLE 3

Example of how each protocol layer link states would be without virtualization

| | | Link State Machine Status | | | |
|---|---|---|---|---|---|
| Seq# | Events | LSM #2* | LSM #1* | LSM #0* | P-LSM |
| 1 | ... | Active | Active | Active | Active |
| 2 | Protocol Layer #2 Idle State Request | Active | Active | Active | Active |
| 3 | ... | Active | Active | Active | Active |
| 4 | Protocol Layer #1 Idle State Request | Active | Active | Active | Active |
| 5 | ... | Active | Active | Active | Active |
| 6 | ARB-MUX Layer Idle State Request | Active | Active | Active | Active |
| 7 | ... | Idle | Idle | Idle | Idle |

Link State Machines are not virtualized and hence each column reflect the actual P-LSM state. Without virtualization, physical link states are maintained for each LSM despite requests for link state changes.

Figure 6:
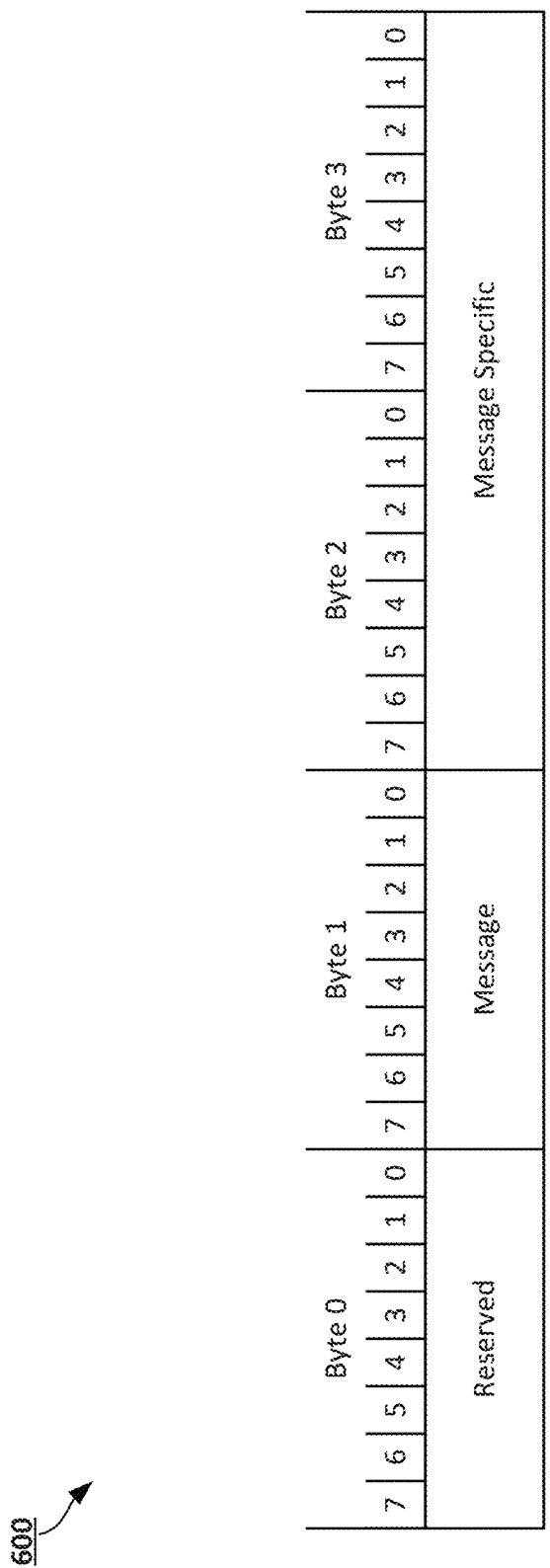
FIG. 6 is a schematic diagram of an example physical layer packet (PLP) format in accordance with embodiments of the present disclosure.

FIG. 6 is a schematic diagram of an example physical layer packet (PLP) 600 format in accordance with embodiments of the present disclosure. Virtualization of the Link State Machines is achieved by having each die's V-LSM communicate with each other over the on-package interconnect using "Physical Layer Packet" (PLP). The R-Link PLP is defined as a one Double-Word (1DW) data packet that originates from one Physical Layer (e.g. Logical PHY or ARB-MUX) and terminates at the opposite Physical Layer. FIG. 6 illustrates a generic 1 DW structure/format for a PLP. The PLPs used for virtualization of the R-Link V-LSMs are called LPIF STATE CONTROL PLP. The specific definition of Byte1, Byte2 and Byte3 are shown in Tables 4 and 5 below.

TABLE 4

Byte 1 Definition of R-Link Physical Layer Packet

| Message Encoding [Byte 1] | Description |
|---|---|
| 0000_0001 | LINK_CONTROL: Used to configure the link and for ACTIVE to Next state transition. Request type PLP is sent only from upstream devices to downstream devices. Acknowledgement PLP type is sent only from downstream devices to upstream devices. |
| 0000_0010 | FLUSH: Used to do an in-band flush of all packets before specific state changes. This PLP is sent from both upstream and downstream devices. |
| 0000_0011 | Reserved |
| 0000_0100 | PM_ENTER_IDLE_L1: Used by downstream devices to request entry into IDLE_L1. This PLP is sent only from downstream devices to upstream devices. |
| 0000_0101 | PM_ENTER_SLEEP_L2: Used by downstream devices to request entry into IDLE_L2. This PLP is sent only from downstream devices to upstream devices. |
| 0000_1111 | PM_REQUEST_NAK: Used by upstream devices to NAK L1 entry request from downstream devices. This PLP is sent only from upstream devices to downstream devices. |
| 0000_1000 | LPIF_STATE_CONTROL: Used to control LPIF state transition. This PLP is sent from both upstream and downstream devices. |
| All Others | Reserved |

TABLE 5

Byte 2 and Byte 3 Definition of the R-Link LPIF_STATE_CONTROL PLP

| | Description |
|---|---|
| Byte 2 Bit | |
| 3:0 | LPIF State Encoding:<br>0000: RESET (For Status Only)<br>0001: ACTIVE<br>0010: Reserved<br>0011: Deepest Allowable PM State (For Request Only)<br>0100: L1.1<br>0101: L1.2<br>0110: L1.3<br>0111: L1.4<br>1000: L2<br>1001: LINKRESET<br>1010: LINKERROR (For Status Only)<br>1011: RETRAIN (For Status Only)<br>1100: DISABLE<br>1101: Reserved<br>1110: Reserved<br>1111: Reserved |
| 6:4 | Reserved |
| 7 | Request/Status Type<br>1: LPIF_STATE_CONTROL Request PLP<br>0: LPIF_STATE_CONTROL Status PLP |
| Byte 3 Bit | |
| 3:0 | LPIF Instance Number: Indicates the targeted LPIF interface when there's multiple LPIF interfaces present.<br>Note: Use a value '0000b' in the case of single LPIF interface. |
| 7:4 | Reserved |

The LPIF_STATE_CONTROL PLP is used as a full handshake between the matching V-LSMs on both die to convey request and status for the virtualized link states. A V-LSM can send a LPIF_STATE_CONTROL Request (a.k.a. STATE_REQ) PLP to convey its intention to enter a specific virtualized link state. The receiver of the PLP can respond with a LPIF_STATE_CONTROL Status (a.k.a. STATE_STS) PLP once it is ready to enter into the requested virtualized state.

Figure 7:
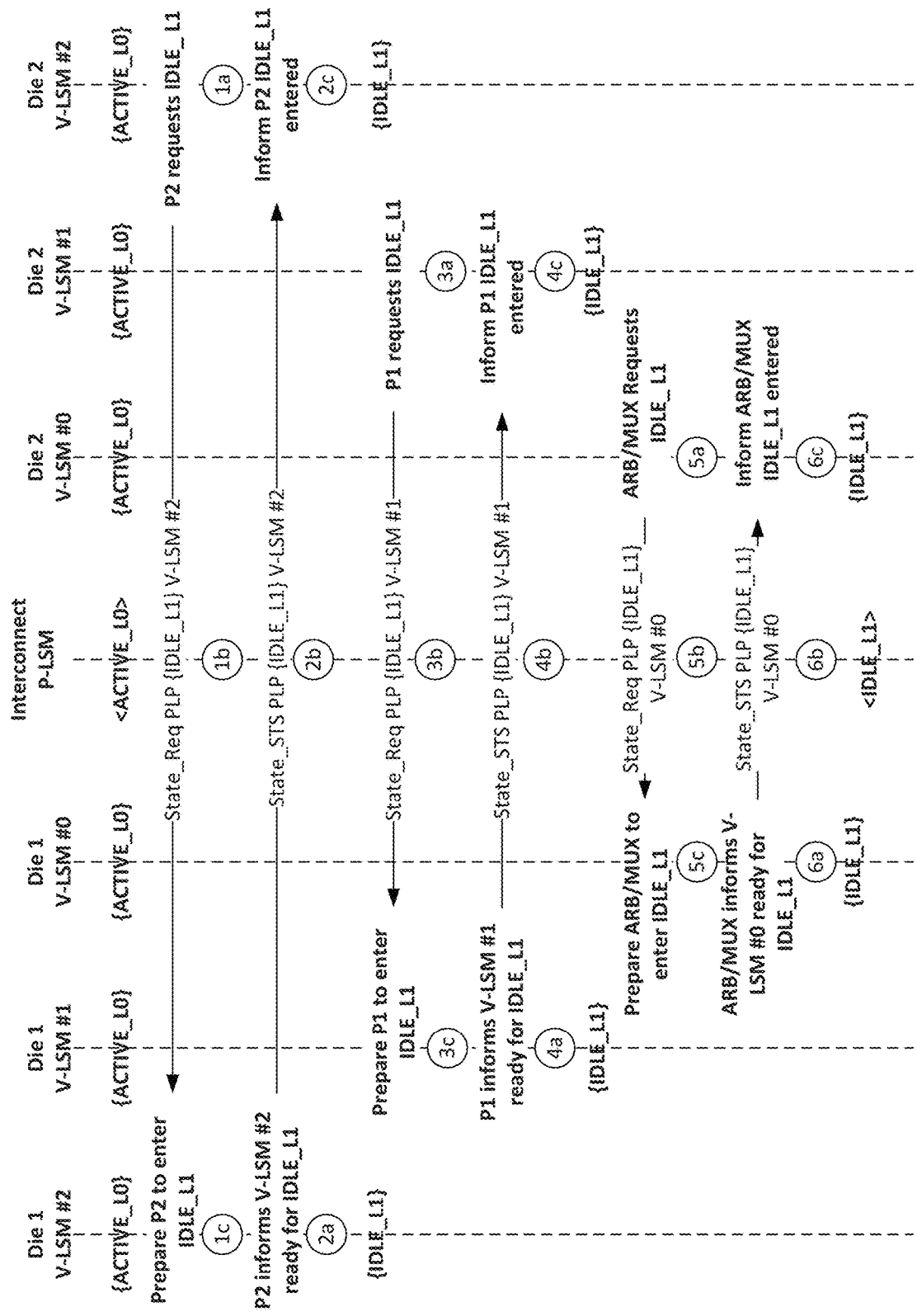
FIG. 7 is a swim lane diagram illustrating example message flows for changing virtual and physical link states from an active state to an idle state in accordance with embodiments of the present disclosure.
Figure 8A:
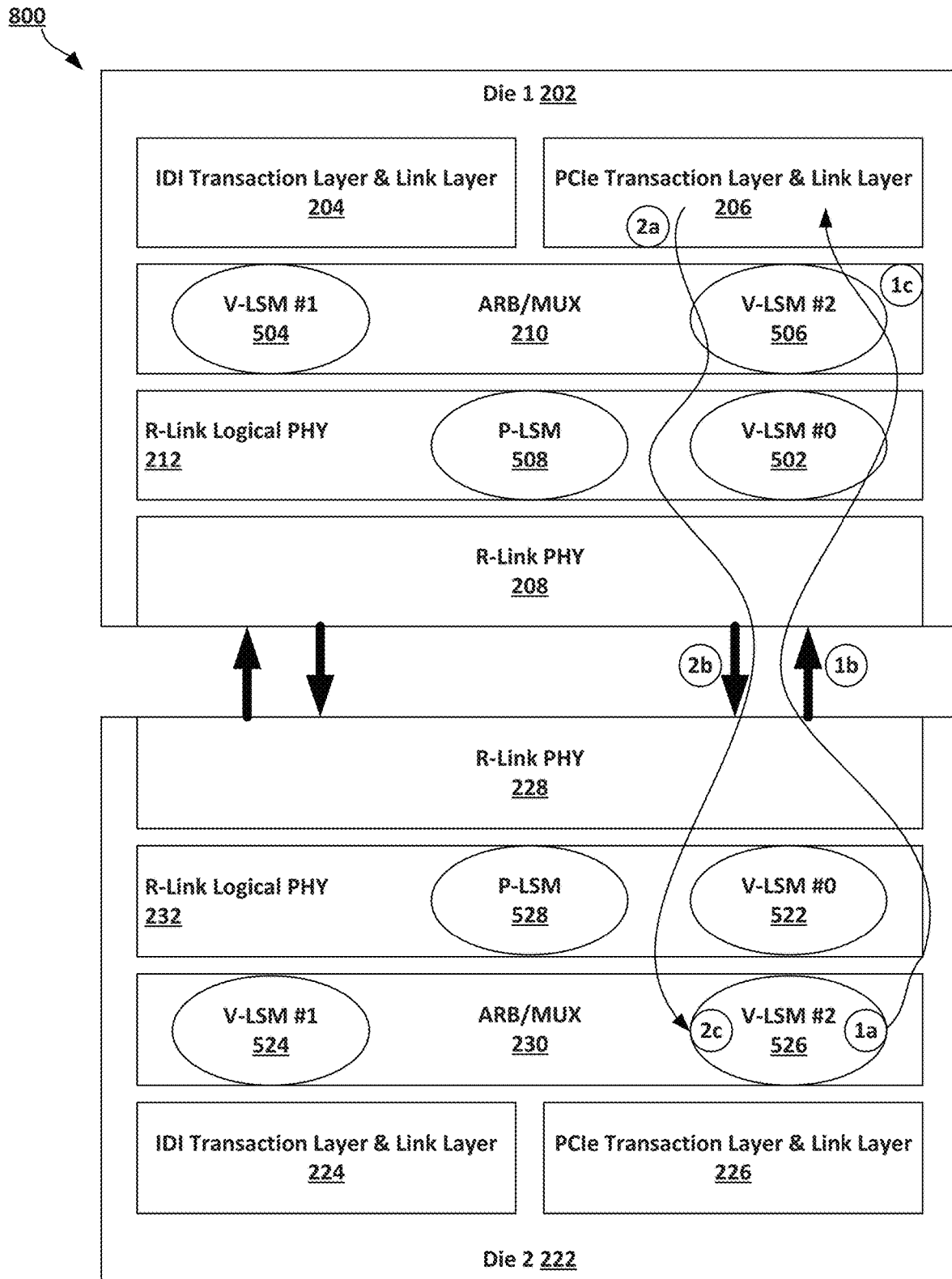
FIGS. 8A-8C are schematic diagrams illustrating a Multichip Package Link (MCPL) illustrating message flow pathways in accordance with embodiments of the present disclosure.
Figure 8B:
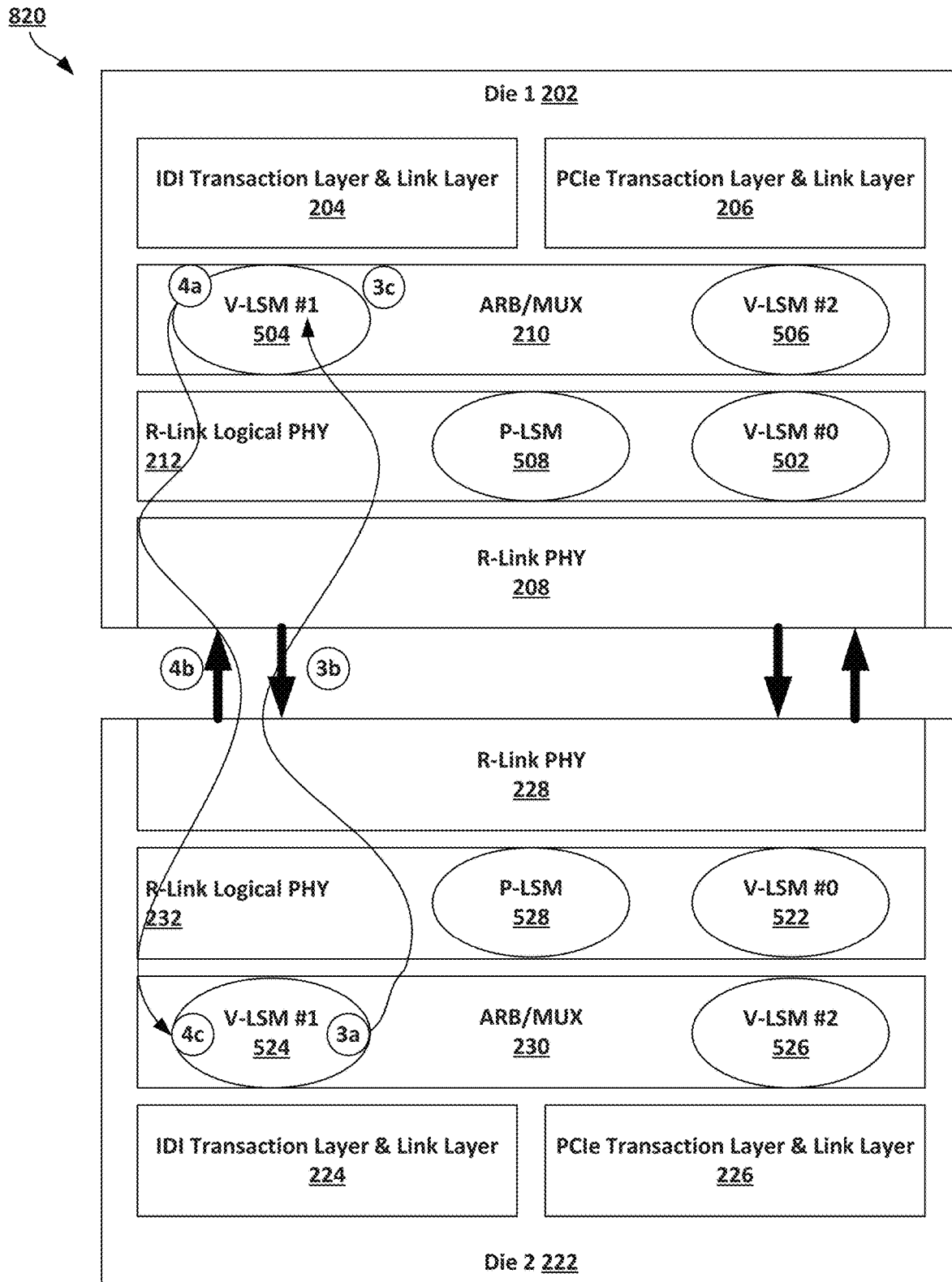
Figure 8C:
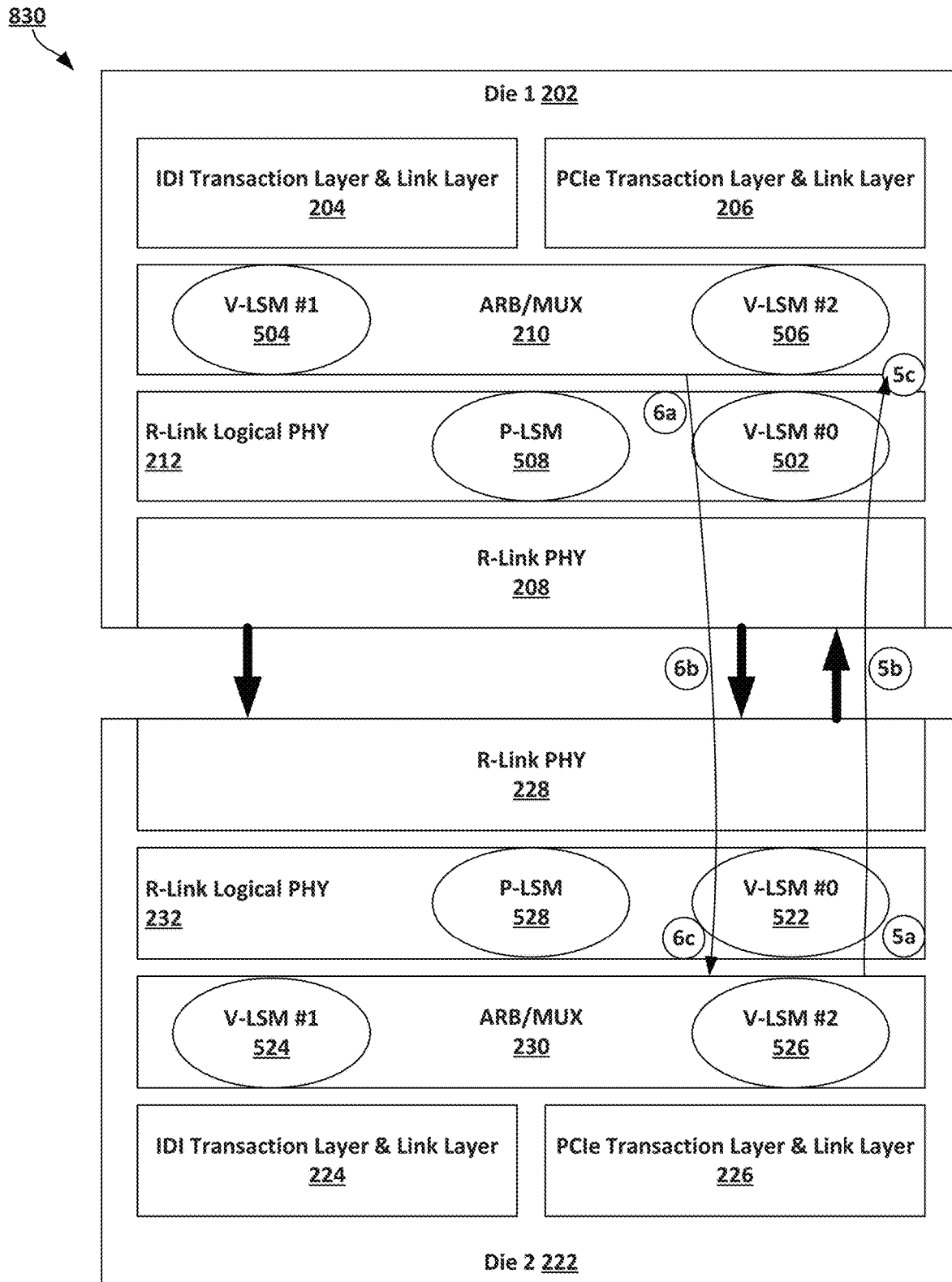

FIG. 7 is a swim lane diagram illustrating example message flows for changing virtual and physical link states from an active state to an idle state in accordance with embodiments of the present disclosure. FIG. 7 illustrates an example flow on how the V-LSMs enter into IDLE_L1 state, though other state changes can be performed in a similar (though not necessarily identical) manner. FIGS. 8A-8C are schematic diagrams illustrating Multichip Package Link (MCPL) illustrating message flow pathways in accordance with embodiments of the present disclosure. FIG. 7 and FIGS. 8A-8C can be taken together to better depict the message flow between the two dies.

Virtual link states can be maintained by the ARB/MUX of each die for each protocol supported by each die. The ARB/MUX of each die can provide various functions, including maintaining virtual link states and changing virtual link states based on requests.

I) At the outset, Die 2 V-LSM #2 Requests for IDLE_L1 state entry:

1a) Die 2 Protocol #2 requests for IDLE_L1 state entry and 1b) the ARB/MUX of die 2 sends a STATE_REQ PLP IDLE_L1 across the link to Die 1. 1c) Die 1 V-LSM #2 receives the PLP and prepares Protocol #2 for IDLE_L1 entry.

II) Die 1 V-LSM #2 Acknowledging IDLE_L1 state entry:

2a) Die 1 Protocol #2 informs V-LSM #2 it is ready for IDLE_L1 entry (e.g., after completing any pending transactions). 2b) Die 1 V-LSM #2 sends STATE_STS PLP IDLE_L1 to Die 2 across link. 2c) Die 2 V-LSM #2 informs Protocol #2 IDLE_L1 state entry is completed.

III) At the outset, Die 2 V-LSM #1 Requests for IDLE_L1 state entry:

3a) Die 2 Protocol #1 requests for IDLE_L1 state entry and 3b) sends a STATE_REQ PLP IDLE_L1 across the link to Die 1. 3c) Die 1 V-LSM #1 receives the PLP and prepares Protocol #1 for IDLE_L1 entry.

IV) Die 1 V-LSM #1 Acknowledging IDLE_L1 state entry:

4a) Die 1 Protocol #1 informs V-LSM #1 it is ready for IDLE_L1 entry (e.g., after completing any pending transactions). 4b) Die 1 V-LSM #1 sends STATE_STS PLP IDLE_L1 to Die 2 across link. 4c) Die 2 V-LSM #1 informs Protocol #1 IDLE_L1 state entry is completed.

V) Die 2 V-LSM #0 Requesting for IDLE_L1 state entry:

5a) Die 2ARB-MUX requests for IDLE_L1 state entry and 5b) sends a STATE_REQ PLP IDLE_L1 to Die 1 across link. 5c) Die 1 V-LSM #0 receives the PLP and prepares ARB-MUX for IDLE_L1 entry.

VI) Die 1 V-LSM #0 Acknowledging IDLE_L1 state entry:

6a) Die 1 ARB-MUX informs V-LSM #0 it is ready for IDLE_L1 entry. 6b) Die 1 V-LSM #0 sends STATE_STS PLP IDLE_L1 to Die 2 across link. 6c) Die 2 V-LSM #0 informs ARB-MUX IDLE_L1 state entry is completed.

Besides being used for virtualization, these PLP handshakes also allows protocol layers (e.g. coherent protocol) to enter virtualized link state without the need of higher level handshakes at the protocol layer side. For example, a coherent protocol layer could request for IDLE_L1 link state entry purely based on its local protocol's idleness. The V-LSMs on both dies can serve as an apparatus to the protocol stacks on both dies to enter their IDLE_L1 link state. Noteworthy is that at the outset, the P-LSM indicates an L0 state, and by the end of the messaging, the P-LSM is in L1.

The figures above describe a simplified flow whereby one die is the master of the V-LSM request while the other die is always the slave. The systems, methods, devices, and computer program products described herein can be mirrored; or can be applied for implementations where each die can have dual roles (i.e. both master and slave).

Figure 9:
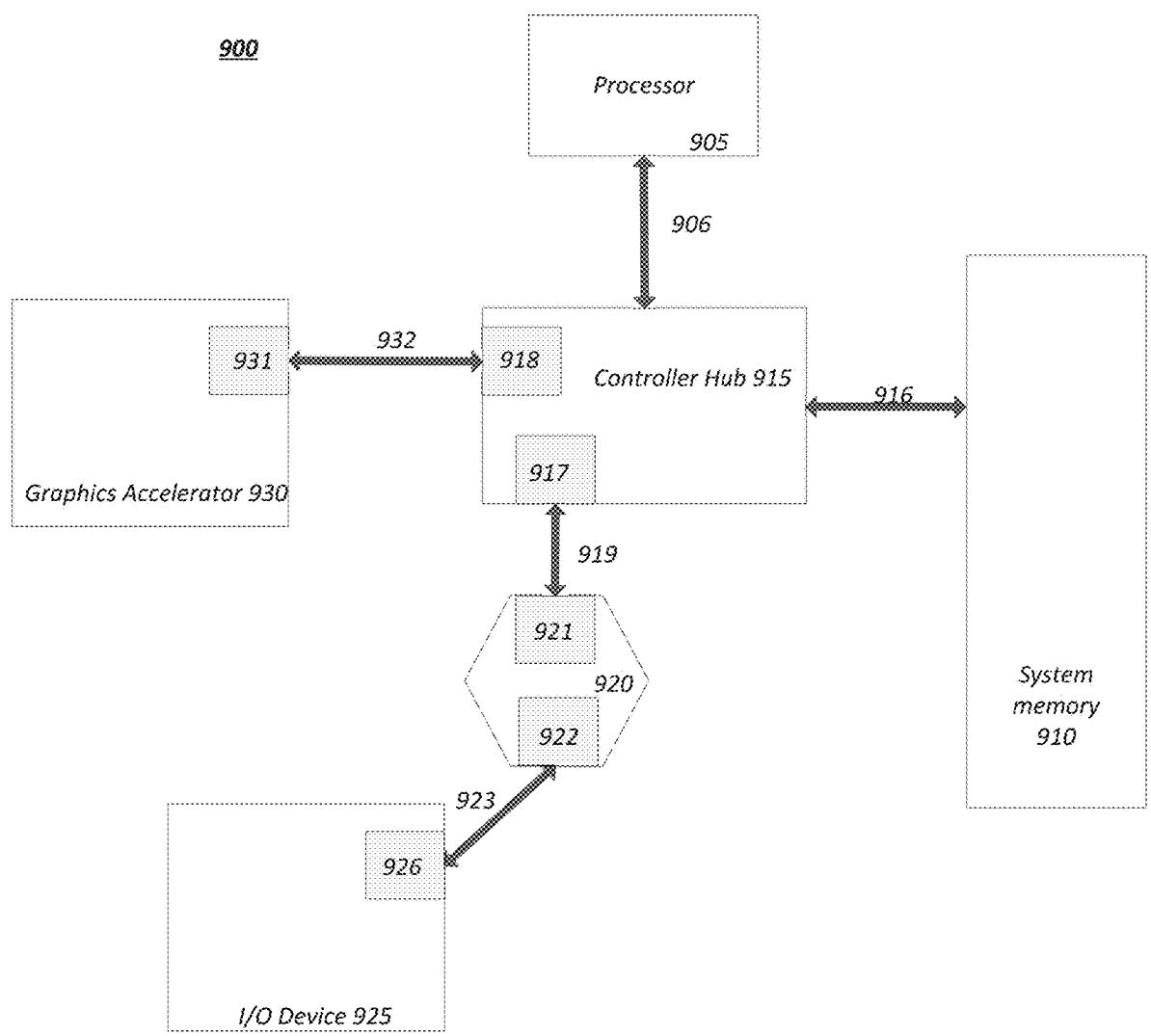
FIG. 9 illustrates an embodiment of a computing system including an interconnect architecture.

Referring to FIG. 9, an embodiment of a fabric composed of point-to-point Links that interconnect a set of components is illustrated. System 900 includes processor 905 and system memory 910 coupled to controller hub 915. Processor 905 includes any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect as described below. In another embodiment, link 906 includes a serial, differential interconnect architecture that is compliant with different interconnect standard.

System memory 910 includes any memory device, such as random access memory (RAM), non-volatile (NV) memory, or other memory accessible by devices in system 900. System memory 910 is coupled to controller hub 915 through memory interface 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a Peripheral Component Interconnect Express (PCIe or PCIE) interconnection hierarchy. Examples of controller hub 915 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described below. In some embodiments, peer-to-peer routing is optionally supported through root complex 915.

Here, controller hub 915 is coupled to switch/bridge 920 through serial link 919. Input/output modules 917 and 921, which may also be referred to as interfaces/ports 917 and 921, include/implement a layered protocol stack to provide communication between controller hub 915 and switch 920. In one embodiment, multiple devices are capable of being coupled to switch 920.

Switch/bridge 920 routes packets/messages from device 925 upstream, i.e. up a hierarchy towards a root complex, to controller hub 915 and downstream, i.e. down a hierarchy away from a root controller, from processor 905 or system memory 910 to device 925. Switch 920, in one embodiment, is referred to as a logical assembly of multiple virtual PCI-to-PCI bridge devices. Device 925 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 925 may include a PCIe to PCI/PCI-X bridge to support legacy or other version PCI devices. Endpoint devices in PCIe are often classified as legacy, PCIe, or root complex integrated endpoints.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. Similar to the MCH discussion above, a graphics controller or the graphics accelerator 930 itself may be integrated in processor 905.

Figure 10:
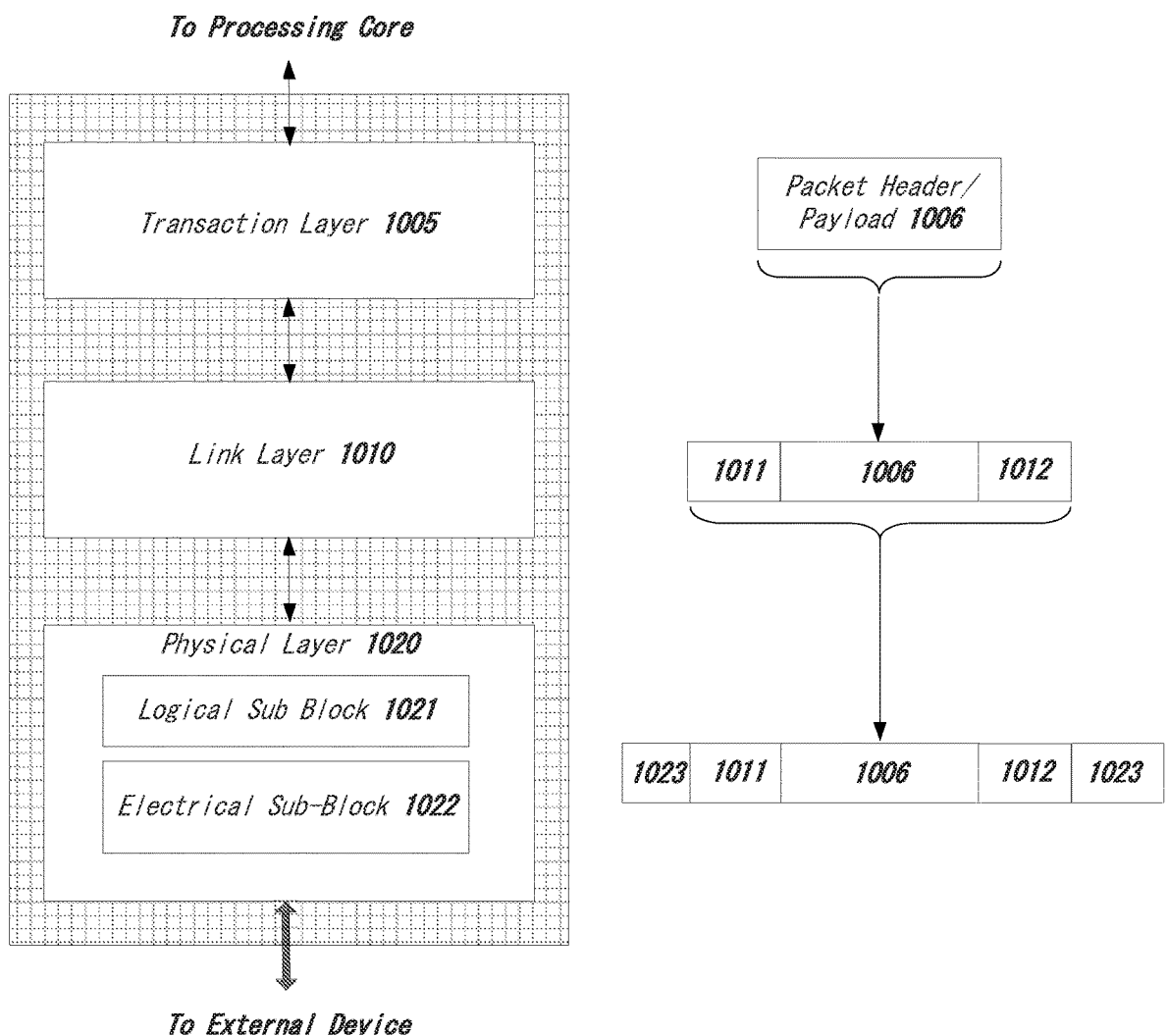
FIG. 10 illustrates an embodiment of a interconnect architecture including a layered stack.

Turning to FIG. 10 an embodiment of a layered protocol stack is illustrated. Layered protocol stack 1000 includes any form of a layered communication stack, such as a Quick Path Interconnect (QPI) stack, a PCie stack, a next generation high performance computing interconnect stack, or other layered stack. Although the discussion immediately below in reference to FIGS. 9-12 are in relation to a PCIe stack, the same concepts may be applied to other interconnect stacks. In one embodiment, protocol stack 1000 is a PCIe protocol stack including transaction layer 1005, link layer 1010, and physical layer 1020. An interface, such as interfaces 917, 918, 921, 922, 926, and 931 in FIG. 1, may be represented as communication protocol stack 1000. Representation as a communication protocol stack may also be referred to as a module or interface implementing/including a protocol stack.

PCI Express uses packets to communicate information between components. Packets are formed in the Transaction Layer 1005 and Data Link Layer 1010 to carry the information from the transmitting component to the receiving component. As the transmitted packets flow through the other layers, they are extended with additional information necessary to handle packets at those layers. At the receiving side the reverse process occurs and packets get transformed from their Physical Layer 1020 representation to the Data Link Layer 1010 representation and finally (for Transaction Layer Packets) to the form that can be processed by the Transaction Layer 1005 of the receiving device.

Transaction Layer

In one embodiment, transaction layer 1005 is to provide an interface between a device's processing core and the interconnect architecture, such as data link layer 1010 and physical layer 1020. In this regard, a primary responsibility of the transaction layer 1005 is the assembly and disassembly of packets (i.e., transaction layer packets, or TLPs). The translation layer 1005 typcially manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1005. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1005 assembles packet header/payload 1006. Format for current packet headers/payloads may be found in the PCIe specification at the PCIe specification website.

Figure 11:
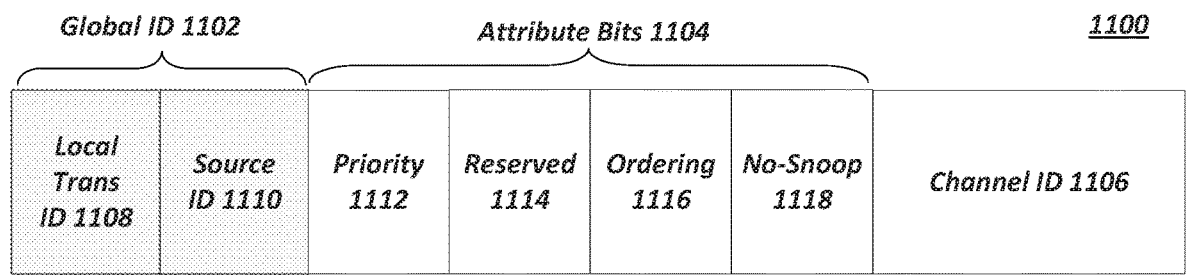
FIG. 11 illustrates an embodiment of a request or packet to be generated or received within an interconnect architecture.

Quickly referring to FIG. 11, an embodiment of a PCIe transaction descriptor is illustrated. In one embodiment, transaction descriptor 1100 is a mechanism for carrying transaction information. In this regard, transaction descriptor 1100 supports identification of transactions in a system. Other potential uses include tracking modifications of default transaction ordering and association of transaction with channels.

Transaction descriptor 1100 includes global identifier field 1102, attributes field 1104 and channel identifier field 1106. In the illustrated example, global identifier field 1102 is depicted comprising local transaction identifier field 1108 and source identifier field 1110. In one embodiment, global transaction identifier 1102 is unique for all outstanding requests.

According to one implementation, local transaction identifier field 1108 is a field generated by a requesting agent, and it is unique for all outstanding requests that require a completion for that requesting agent. Furthermore, in this example, source identifier 1110 uniquely identifies the requestor agent within a PCIe hierarchy. Accordingly, together with source ID 1110, local transaction identifier 1108 field provides global identification of a transaction within a hierarchy domain.

Attributes field 1104 specifies characteristics and relationships of the transaction. In this regard, attributes field 1104 is potentially used to provide additional information that allows modification of the default handling of transactions. In one embodiment, attributes field 1104 includes priority field 1112, reserved field 1114, ordering field 1116, and no-snoop field 1118. Here, priority sub-field 1112 may be modified by an initiator to assign a priority to the transaction. Reserved attribute field 1114 is left reserved for future, or vendor-defined usage. Possible usage models using priority or security attributes may be implemented using the reserved attribute field.

In this example, ordering attribute field 1116 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1118 is utilized to determine if transactions are snooped. As shown, channel ID Field 1106 identifies a channel that a transaction is associated with.

Link Layer

Link layer 1010, also referred to as data link layer 1010, acts as an intermediate stage between transaction layer 1005 and the physical layer 1020. In one embodiment, a responsibility of the data link layer 1010 is providing a reliable mechanism for exchanging Transaction Layer Packets (TLPs) between two components a link. One side of the Data Link Layer 1010 accepts TLPs assembled by the Transaction Layer 1005, applies packet sequence identifier 1011, i.e. an identification number or packet number, calculates and applies an error detection code, i.e. CRC 1012, and submits the modified TLPs to the Physical Layer 1020 for transmission across a physical to an external device.

Physical Layer

In one embodiment, physical layer 1020 includes logical sub block 1021 and electrical sub-block 1022 to physically transmit a packet to an external device. Here, logical sub-block 1021 is responsible for the "digital" functions of Physical Layer 1021. In this regard, the logical sub-block includes a transmit section to prepare outgoing information for transmission by physical sub-block 1022, and a receiver section to identify and prepare received information before passing it to the Link Layer 1010.

Physical block 1022 includes a transmitter and a receiver. The transmitter is supplied by logical sub-block 1021 with symbols, which the transmitter serializes and transmits onto to an external device. The receiver is supplied with serialized symbols from an external device and transforms the received signals into a bit-stream. The bit-stream is de-serialized and supplied to logical sub-block 1021. In one embodiment, an 8b/10b transmission code is employed, where ten-bit symbols are transmitted/received. Here, special symbols are used to frame a packet with frames 1023. In addition, in one example, the receiver also provides a symbol clock recovered from the incoming serial stream.

As stated above, although transaction layer 1005, link layer 1010, and physical layer 1020 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 12:
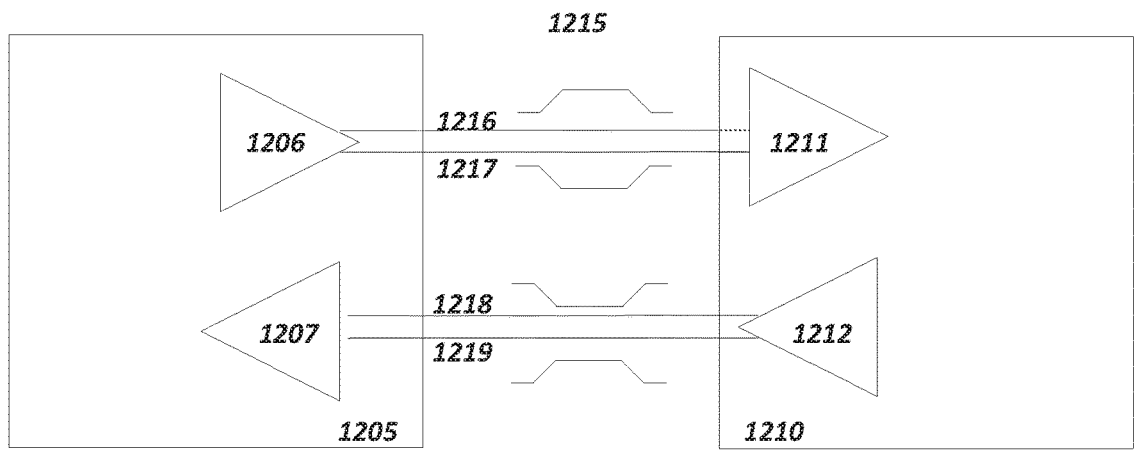
FIG. 12 illustrates an embodiment of a transmitter and receiver pair for an interconnect architecture.

Referring next to FIG. 12, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1206/1211 and a receive pair 1212/1207. Accordingly, device 1205 includes transmission logic 1206 to transmit data to device 1210 and receiving logic 1207 to receive data from device 1210. In other words, two transmitting paths, i.e. paths 1216 and 1217, and two receiving paths, i.e. paths 1218 and 1219, are included in a PCIe link.

A transmission path refers to any path for transmitting data, such as a transmission line, a copper line, an optical line, a wireless communication channel, an infrared communication link, or other communication path. A connection between two devices, such as device 1205 and device 1210, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 13:
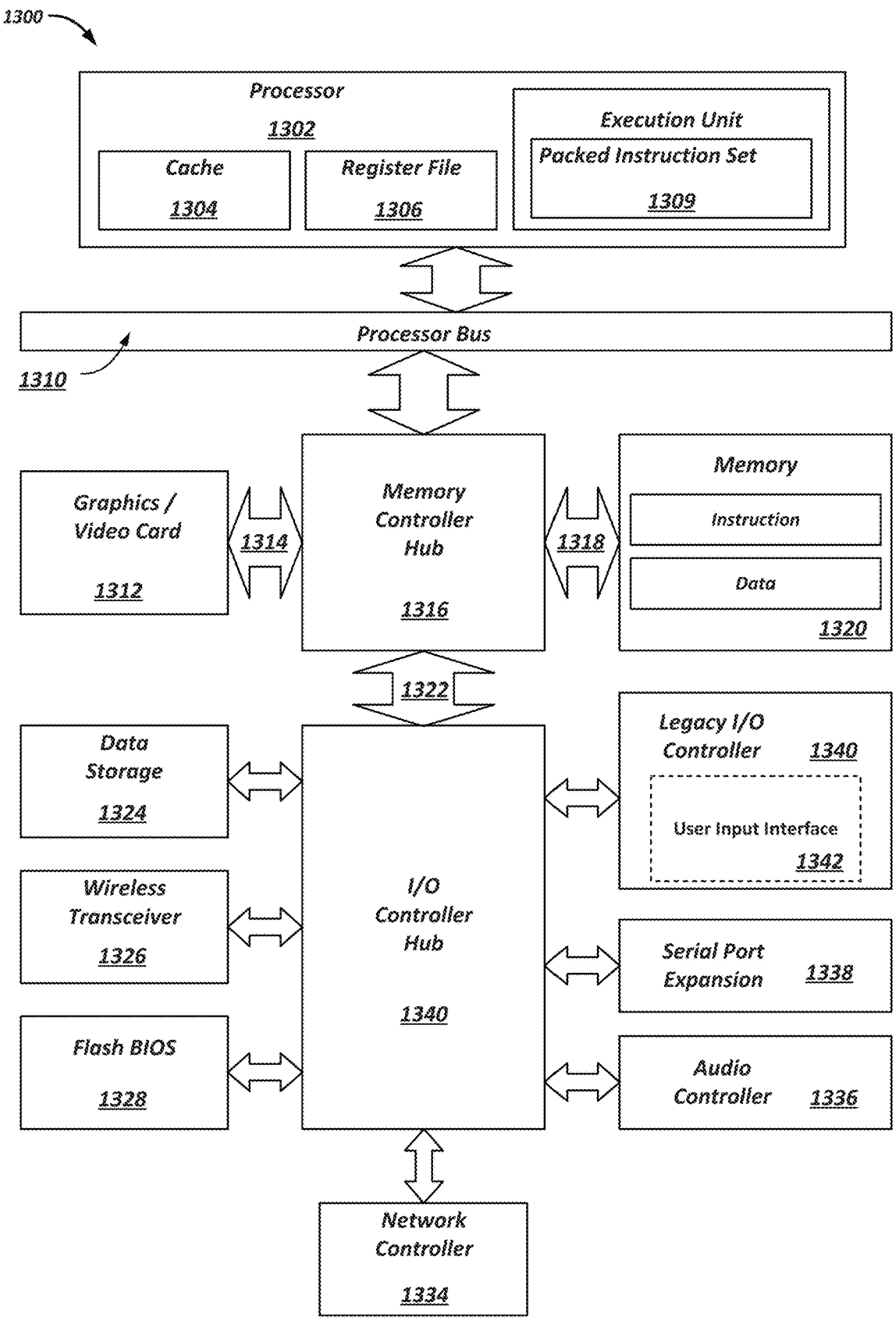
FIG. 13 illustrates another embodiment of a block diagram for a computing system including a processor.

Turning to FIG. 13, a block diagram of an exemplary computer system formed with a processor that includes execution units to execute an instruction, where one or more of the interconnects implement one or more features in accordance with one embodiment of the present disclosure is illustrated. System 1300 includes a component, such as a processor 1302 to employ execution units including logic to perform algorithms for process data, in accordance with the present disclosure, such as in the embodiment described herein. System 1300 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1302 includes one or more execution units 1308 to implement an algorithm that is to perform at least one instruction. One embodiment may be described in the context of a single processor desktop or server system, but alternative embodiments may be included in a multiprocessor system. System 1300 is an example of a 'hub' system architecture. The computer system 1300 includes a processor 1302 to process data signals. The processor 1302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1302 is coupled to a processor bus 1310 that transmits data signals between the processor 1302 and other components in the system 1300. The elements of system 1300 (e.g. graphics accelerator 1312, memory controller hub 1316, memory 1320, I/O controller hub 1324, wireless transceiver 1326, Flash BIOS 1328, Network controller 1334, Audio controller 1336, Serial expansion port 1338, I/O controller 1340, etc.) perform their conventional functions that are well known to those familiar with the art.

In one embodiment, the processor 1302 includes a Level 1 (L1) internal cache memory 1304. Depending on the architecture, the processor 1302 may have a single internal cache or multiple levels of internal caches. Other embodiments include a combination of both internal and external caches depending on the particular implementation and needs. Register file 1306 is to store different types of data in various registers including integer registers, floating point registers, vector registers, banked registers, shadow registers, checkpoint registers, status registers, and instruction pointer register.

Execution unit 1308, including logic to perform integer and floating point operations, also resides in the processor 1302. The processor 1302, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1302. For one embodiment, execution unit 1308 includes logic to handle a packed instruction set 1309. By including the packed instruction set 1309 in the instruction set of a general-purpose processor 1302, along with associated circuitry to execute the instructions, the operations used by many multimedia applications may be performed using packed data in a general-purpose processor 1302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1308 may also be used in micro controllers, embedded processors, graphics devices, DSPs, and other types of logic circuits. System 1300 includes a memory 1320. Memory 1320 includes a dynamic random access memory (DRAM) device, a static random access memory (SRAM) device, flash memory device, or other memory device. Memory 1320 stores instructions and/or data represented by data signals that are to be executed by the processor 1302.

Note that any of the aforementioned features or aspects of the disclosure may be utilized on one or more interconnect illustrated in FIG. 13. For example, an on-die interconnect (ODI), which is not shown, for coupling internal units of processor 1302 implements one or more aspects of the disclosure described above. Or the disclosure is associated with a processor bus 1310 (e.g. Intel Quick Path Interconnect (QPI) or other known high performance computing interconnect), a high bandwidth memory path 1318 to memory 1320, a point-to-point link to graphics accelerator 1312 (e.g. a Peripheral Component Interconnect express (PCIe) compliant fabric), a controller hub interconnect 1322, an I/O or other interconnect (e.g. USB, PCI, PCIe) for coupling the other illustrated components. Some examples of such components include the audio controller 1336, firmware hub (flash BIOS) 1328, wireless transceiver 1326, data storage 1324, legacy I/O controller 1310 containing user input and keyboard interfaces 1342, a serial expansion port 1338 such as Universal Serial Bus (USB), and a network controller 1334. The data storage device 1324 can comprise a hard disk drive, a floppy disk drive, a CD-ROM device, a flash memory device, or other mass storage device.

Figure 14:
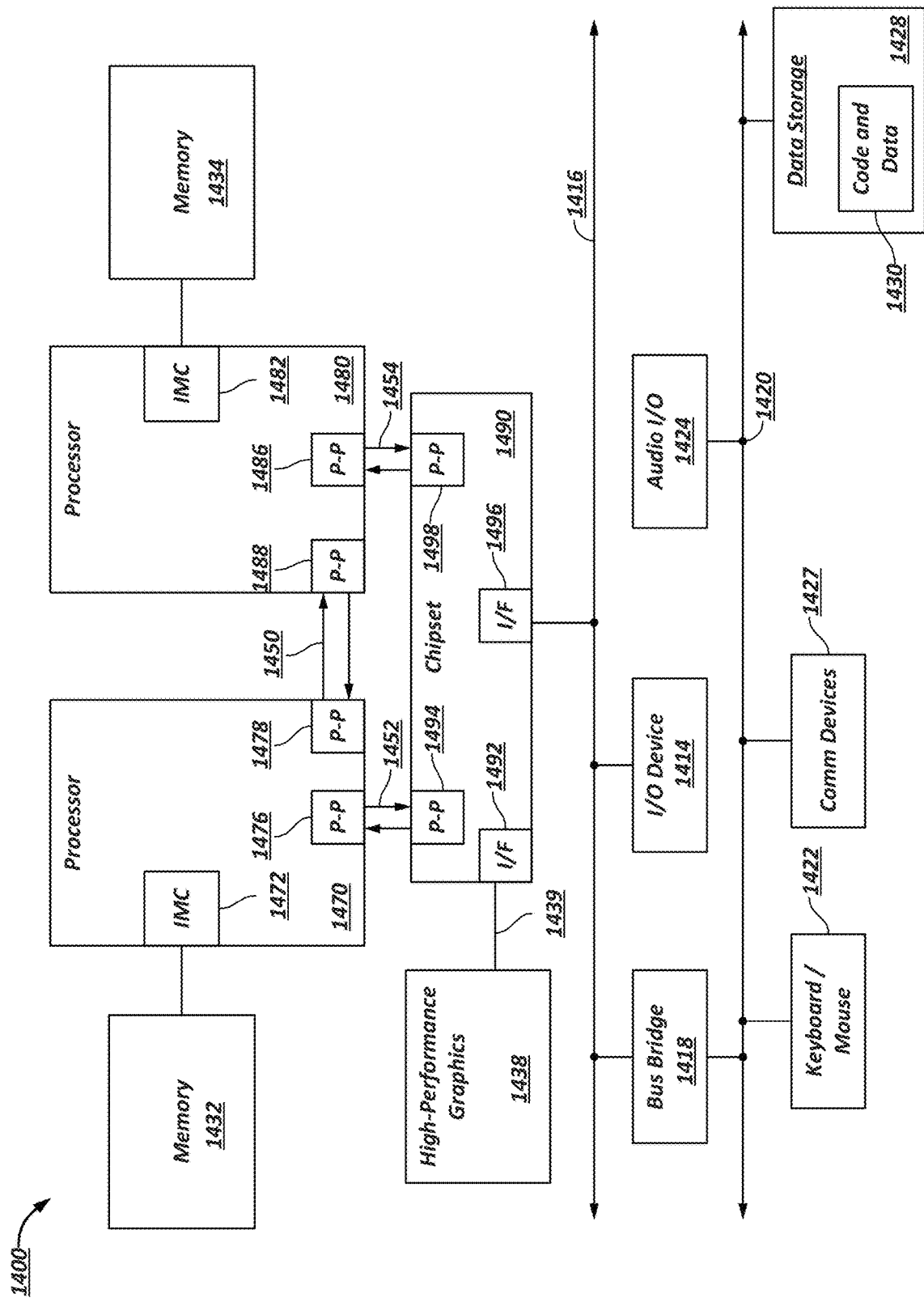
FIG. 14 illustrates an embodiment of a block for a computing system including multiple processor sockets.

Referring now to FIG. 14, shown is a block diagram of a second system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as Intel's Quick Path Interconnect (QPI) architecture. As a result, the disclosure may be implemented within the QPI architecture.

While shown with only two processors 1470, 1480, it is to be understood that the scope of the present disclosure is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

Figure 15:
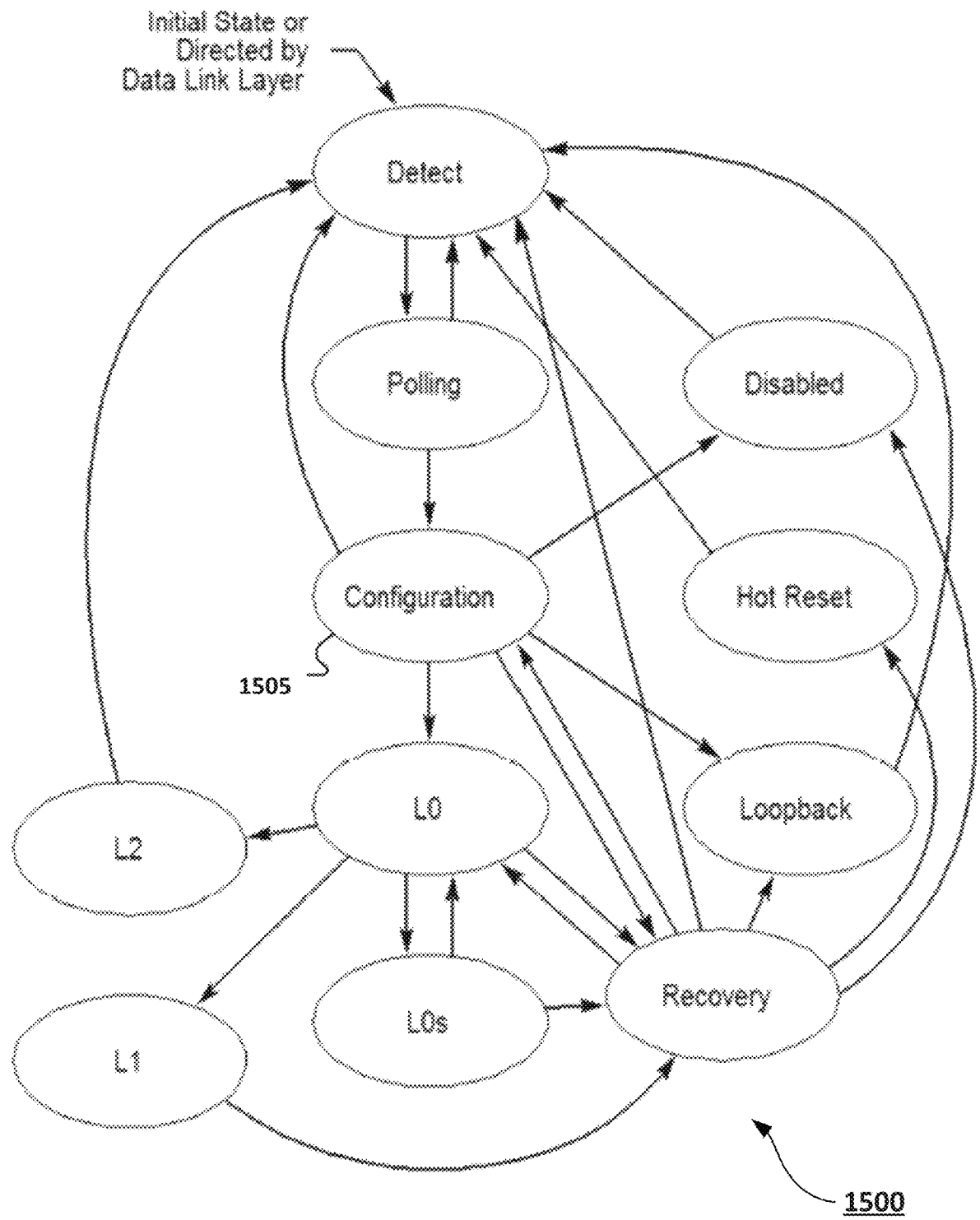
FIG. 15 is a diagram illustrating an example link training state machine.

Turning to the diagram 1500 of FIG. 15, an example link training state machine is shown, such as the PCIe link training and status state machine (LTSSM). For a system utilizing a PHY according to a particular protocol to support multiple alternative protocols (i.e., to run on top of the PHY), ordered sets may be defined that are to be communicated between two or more devices on a link in connection with the training of the link. For instance, training set (TS) ordered sets (OSes) may be sent. In an implementation utilizing PCIe as the PHY protocol, the TS ordered sets may include a TS1 and a TS2 ordered set, among other example ordered sets. The ordered sets and training sequences sent during link training may be based on the particular link training state, with various link training states utilized to accomplish corresponding link training activities and objectives.

In one example, such as illustrated in FIG. 15, a link training state machine 1600 may include such states as a Reset state, a Detect state (e.g., to detect a far end termination (e.g., another device connected to the lanes), a Polling state (e.g., to establish symbol lock and configure lane polarity), a Configuration (or "Config") state (e.g., to configure the physical lanes of a connection into a link with particular lane width, lane numbering, etc., performing lane-to-lane deskew and other link configuration activities), a Loopback state (e.g., to perform testing, fault isolation, equalization, and other tasks), a Recovery state (e.g., for use to change the data rate of operation, re-establish bit lock, Symbol lock or block alignment, perform lane-to-lane deskew, etc.) among other states, which may be utilized to bring the link to an active link state (e.g., L0). In one example, training sequences to be sent in a particular one (or more) of the link training states may be defined to accommodate the negotiation of a particular one of the supported protocols of a particular device. For instance, the particular training state may be a training state preceding entry into an active link state, or a training state in which the data rate may be upscaled (e.g., beyond that supported by at least one of the supported protocols), such as a PCIe state where a data rate transitions from a Gen1 speed to Gen3 and higher speeds, among other examples. For instance, in the example implementation shown in FIG. 15, a configuration state (e.g., 1505) may be utilized and augmented to allow negotiation of a particular one of multiple protocols in parallel with the link training activities defined natively in the training state (e.g., lane width determination, lane numbering, deskew, equalization, etc.). For instance, particular training sequences may be defined for the training state and these training sequences may be augmented to allow information to be communicated (e.g., in one or more fields or symbols of the ordered set) to identify whether each device on the link supports multiple protocols (e.g., at least one protocol stack other than the protocol stack of the physical layer and the corresponding link training state machine), identify the particular protocols each device supports, and agree upon one or more protocols to employ over the particular PHY (e.g., through a handshake accomplished through the transmission of these training sequences across the link (in both the upstream and downstream directions)).

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0) in the lowest supported data rate (e.g., the PCIe Gen 1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The systems, methods, and apparatuses can include one or a combination of the following examples:

Example 1 an apparatus comprising a hardware processor; a port to interface with a multilane link; and arbitration logic implemented at least partially in hardware. The arbitration logic to maintain a first virtual link state associated with a first interconnect protocol; maintain a second virtual link state associated with a second interconnect protocol; receive, from across the multilane link, a physical layer packet indicating a request to change a state of the first virtual link state; determine that the first interconnect protocol is ready to change a physical link state; and change the first virtual link state according to the physical layer packet while maintaining the second virtual link state.

Example 2 may include the subject matter of example 1, the arbitration logic to transmit across the multilane link a physical layer packet indicating that the first protocol has changed the first virtual link state.

Example 3 may include the subject matter of any of examples 1-2, the arbitration logic to receive, from across the multilane link, a physical layer packet indicating a request to change a state of the second virtual link state; determine that the second interconnect protocol is ready to change the second virtual link state; and change the second virtual link state according to the physical layer packet while maintaining the third virtual link state.

Example 4 may include the subject matter of example 3, the arbitration logic to transmit across the multilane link a physical layer packet indicating that the second protocol has changed the second virtual link state.

Example 5 may include the subject matter of any of examples 1-4, the arbitration logic to maintain a third virtual link state associated with the arbitration logic; receive, from across the multilane link, a physical layer packet indicating a request to change a state of the third virtual link state; determine that the arbitration logic is ready to change the third virtual link state; and change the third virtual link state according to the physical layer packet.

Example 6 may include the subject matter of example 5, the arbitration logic to transmit across the multilane link a physical layer packet indicating that the arbitration logic has changed the third virtual link state.

Example 7 may include the subject matter of any of examples 1-6, the apparatus to maintain a physical link state of the multilane link; and to change the physical link state after each virtual link state has been changed.

Example 8 may include the subject matter of any of examples 1-7, wherein the arbitration logic comprises arbitration and multiplexing circuitry.

Example 9 may include the subject matter of any of examples 1-8, wherein one of the interconnect protocols comprises a protocol based on a Peripheral Component Interconnect Express (PCIe) protocol.

Example 10 may include the subject matter of any of examples 1-9, wherein the multilane link comprises a link based on a Rosetta Link interconnect.

Example 11 is a method performed by an arbitration logic, the method comprising receiving an indication on a physical layer packet to change a first virtual link state, the first virtual link state associated with a first interconnect protocol; determining that the first interconnect protocol is ready to change a physical link state associated with the first virtual link state; changing the first virtual link state while maintaining a second virtual link state associated with a second interconnect protocol; and transmitting a physical layer packet across the multilane link indicating a change to the first link state.

Example 12 may include the subject matter of example 11, further comprising receiving an indication on a first physical layer packet to change the second virtual link state, the second virtual link state associated with the second interconnect protocol; determining that the second interconnect protocol is ready to change a physical link state associated with the second virtual link state; changing the second virtual link state; and transmitting a second physical layer packet across the multilane link indicating a change to the second link state.

Example 13 may include the subject matter of any of examples 11-12, further comprising receiving an indication on a physical layer packet to change a third virtual link state, the third virtual link state associated with an arbitration logic; determining that the arbitration logic is ready to change a physical link state associated with the third virtual link state; changing the third virtual link state; transmitting a physical layer packet across the multilane link indicating a change to the third link state; and changing a physical link state associated with the multilane link.

Example 14 may include the subject matter of example 13, further comprising changing a physical link state of the multilane link based on changes to the first, second, and third virtual link states.

Example 15 may include the subject matter of any of 11-14, wherein one of the first or second interconnect protocols comprises a protocol based on a Peripheral Component Interconnect Express (PCIe) protocol.

Example 16 may include the subject matter of any of examples 11-15, wherein the first physical layer packet comprises a state request message and wherein the second physical layer packet comprises a state status message.

Example 17 may include the subject matter of any of examples 11-16, wherein the multilane link comprises a link that connects two dies of a multichip device.

Example 18 is a system comprising a first die comprising a first arbitration and multiplexing logic, a first protocol stack associated with a first interconnect protocol, and a second protocol stack associated with a second interconnect protocol. The system also includes a second die comprising a second arbitration and multiplexing logic; and a multilane link connecting the first die to the second die. The second arbitration and multiplexing logic is to send a request to the first arbitration and multiplexing logic to change a first virtual link state associated with the first protocol stack. The first arbitration and multiplexing logic is to receive, from across the multilane link, the request from the first die indicating a request to change the first virtual link state; determine that the first interconnect protocol is ready to change a physical link state; and change the first virtual link state according to the received request while maintaining a second virtual link state.

Example 19 may include the subject matter of example 18, the first arbitration and multiplexing logic to transmit across the multilane link a physical layer packet indicating a change in the first virtual link state.

Example 20 may include the subject matter of any of examples 18-19, the second arbitration and multiplexing logic to receive the physical layer packet indicating the change in the first virtual link state, and to determine that a first virtual link state associated with a first protocol stack at the second die is ready to change a physical link state; and change a first virtual link state for the first protocol stack at the second die.

Example 21 may include the subject matter of any of examples 18-20, the first arbitration and multiplexing logic to receive, from across the multilane link, a physical layer packet indicating a request to change a state of the second virtual link state; determine that the second interconnect protocol is ready to change a physical link state; and change the second virtual link state according to the physical layer packet while maintaining the third virtual link state.

Example 22 may include the subject matter of example 21, the first arbitration and multiplexing logic to transmit across the multilane link a physical layer packet indicating that the second protocol has changed the second virtual link state.

Example 23 may include the subject matter of any of 18-22, the first arbitration and multiplexing logic to maintain a third virtual link state associated with the first arbitration and multiplexing logic; receive, from across the multilane link, a physical layer packet indicating a request to change a state of the third virtual link state; determine that the first arbitration and multiplexing logic is ready to change a physical link state; and change the third virtual link state according to the physical layer packet.

Example 24 may include the subject matter of example 23, the first arbitration and multiplexing logic to transmit across the multilane link a physical layer packet indicating that the first arbitration and multiplexing logic has changed the third virtual link state.

Example 25 may include the subject matter of any of examples 18-24, wherein the first protocol stack comprises transaction layer and link layer protocols for a Peripheral Component Interconnect Express (PCIe)-based protocol.

Example 26 a machine readable medium including code, when executed, to cause a machine to receiving an indication on a physical layer packet to change a first virtual link state, the first virtual link state associated with a first interconnect protocol; determining that the first interconnect protocol is ready to change a physical link state associated with the first virtual link state; changing the first virtual link state while maintaining a second virtual link state associated with a second interconnect protocol; and transmitting a physical layer packet across the multilane link indicating a change to the first link state.

Example 27 may include the subject matter of example 26, further comprising receiving an indication on a first physical layer packet to change the second virtual link state, the second virtual link state associated with the second interconnect protocol; determining that the second interconnect protocol is ready to change a physical link state associated with the second virtual link state; changing the second virtual link state; and transmitting a second physical layer packet across the multilane link indicating a change to the second link state.

Example 28 may include the subject matter of any of examples 26-27, further comprising receiving an indication on a physical layer packet to change a third virtual link state, the third virtual link state associated with an arbitration logic; determining that the arbitration logic is ready to change a physical link state associated with the third virtual link state; changing the third virtual link state; transmitting a physical layer packet across the multilane link indicating a change to the third link state; and changing a physical link state associated with the multilane link.

Example 29 may include the subject matter of example 28, further comprising changing a physical link state of the multilane link based on changes to the first, second, and third virtual link states.

Example 30 may include the subject matter of any of 26-29, wherein one of the first or second interconnect protocols comprises a protocol based on a Peripheral Component Interconnect Express (PCIe) protocol.

Example 31 may include the subject matter of any of examples 26-30, wherein the first physical layer packet comprises a state request message and wherein the second physical layer packet comprises a state status message.

Example 32 may include the subject matter of any of examples 26-31, wherein the multilane link comprises a link that connects two dies of a multichip device.

Example 33 is an apparatus comprising a means for maintaining a first virtual link state associated with a first interconnect protocol; means for maintaining a second virtual link state associated with a second interconnect protocol; means for receiving, from across the multilane link, a physical layer packet indicating a request to change a state of the first virtual link state; means for determining that the first interconnect protocol is ready to change a physical link state; and means for changing the first virtual link state according to the physical layer packet while maintaining the second virtual link state

What is claimed is:

1. An apparatus comprising:
a hardware processor;
a port to interface with a multilane link; and
arbitration logic implemented at least partially in hardware, the arbitration logic to:
   maintain a first virtual link state associated with a first interconnect protocol;
   maintain a second virtual link state associated with a second interconnect protocol;
   receive, from across the multilane link, a physical layer packet indicating a request to change a state of the first virtual link state;
   determine that the first interconnect protocol is ready to change a physical link state; and
   change the first virtual link state according to the physical layer packet while maintaining the second virtual link state.

2. The apparatus of claim 1, the arbitration logic to transmit across the multilane link a physical layer packet indicating that the first protocol has changed the first virtual link state.

3. The apparatus of claim 1, the arbitration logic to:
receive, from across the multilane link, a physical layer packet indicating a request to change a state of the second virtual link state;
determine that the second interconnect protocol is ready to change the second virtual link state; and
change the second virtual link state according to the physical layer packet while maintaining a third virtual link state.

4. The apparatus of claim 3, the arbitration logic to transmit across the multilane link a physical layer packet indicating that the second protocol has changed the second virtual link state.

5. The apparatus of claim 3, the arbitration logic to:
maintain a third virtual link state associated with the arbitration logic;
receive, from across the multilane link, a physical layer packet indicating a request to change a state of the third virtual link state;
determine that the arbitration logic is ready to change the third virtual link state; and
change the third virtual link state according to the physical layer packet.

6. The apparatus of claim 5, the arbitration logic to transmit across the multilane link a physical layer packet indicating that the arbitration logic has changed the third virtual link state.

7. The apparatus of claim 1, the apparatus to maintain a physical link state of the multilane link; and to change the physical link state after each virtual link state has been changed.

8. The apparatus of claim 1, wherein the arbitration logic comprises arbitration and multiplexing circuitry.

9. The apparatus of claim 1, wherein one of the interconnect protocols comprises a protocol based on a Peripheral Component Interconnect Express (PCIe) protocol.

10. The apparatus of claim 1, wherein the multilane link comprises a link based on a Rosetta Link interconnect.

11. A method performed by an arbitration logic, the method comprising:
receiving an indication on a physical layer packet to change a first virtual link state, the first virtual link state associated with a first interconnect protocol;
determining that the first interconnect protocol is ready to change a physical link state associated with the first virtual link state;
changing the first virtual link state while maintaining a second virtual link state associated with a second interconnect protocol; and
transmitting a physical layer packet across a multilane link indicating a change to the first link state.

12. The method of claim 11, further comprising:
receiving an indication on a first physical layer packet to change the second virtual link state, the second virtual link state associated with the second interconnect protocol;
determining that the second interconnect protocol is ready to change a physical link state associated with the second virtual link state;
changing the second virtual link state; and
transmitting a second physical layer packet across the multilane link indicating a change to the second link state.

13. The method of claim 12, further comprising:
receiving an indication on a physical layer packet to change a third virtual link state, the third virtual link state associated with an arbitration logic;
determining that the arbitration logic is ready to change a physical link state associated with the third virtual link state;
changing the third virtual link state;
transmitting a physical layer packet across the multilane link indicating a change to the third link state; and
changing a physical link state associated with the multilane link.

14. The method of claim 13, further comprising changing a physical link state of the multilane link based on changes to the first, second, and third virtual link states.

15. The method of claim 11, wherein one of the first or second interconnect protocols comprises a protocol based on a Peripheral Component Interconnect Express (PCIe) protocol.

16. The method of claim 11, wherein the multilane link comprises a link that connects two dies of a multichip device.

17. A system comprising:
a first die comprising:
   a first arbitration and multiplexing logic,
   a first protocol stack associated with a first interconnect protocol, and
   a second protocol stack associated with a second interconnect protocol;
a second die comprising a second arbitration and multiplexing logic; and
a multilane link connecting the first die to the second die;
the second arbitration and multiplexing logic to send a request to the first arbitration and multiplexing logic to change a first virtual link state associated with the first protocol stack;
the first arbitration and multiplexing logic to:
   receive, from across the multilane link, the request from the second die indicating a request to change the first virtual link state;
   determine that the first interconnect protocol is ready to change a physical link state; and change the first virtual link state according to the received request while maintaining a second virtual link state.

18. The system of claim 17, the first arbitration and multiplexing logic to transmit across the multilane link a physical layer packet indicating a change in the first virtual link state.

19. The system of claim 18, the second arbitration and multiplexing logic to receive the physical layer packet indicating the change in the first virtual link state, and to:
   determine that a first virtual link state associated with a first protocol stack at the second die is ready to change a physical link state; and
   change a first virtual link state for the first protocol stack at the second die.

20. The system of claim 17, the first arbitration and multiplexing logic to:
   receive, from across the multilane link, a physical layer packet indicating a request to change a state of the second virtual link state;
   determine that the second interconnect protocol is ready to change a physical link state; and
   change the second virtual link state according to the received physical layer packet while maintaining the third virtual link state.

21. The system of claim 20, the first arbitration and multiplexing logic to transmit across the multilane link a physical layer packet indicating that the second protocol has changed the second virtual link state.

22. The system of claim 20, the first arbitration and multiplexing logic to:
   maintain a third virtual link state associated with the first arbitration and multiplexing logic;
   receive, from across the multilane link, a physical layer packet indicating a request to change a state of the third virtual link state;
   determine that the first arbitration and multiplexing logic is ready to change a physical link state; and
   change the third virtual link state according to the physical layer packet.

23. The system of claim 22, the first arbitration and multiplexing logic to transmit across the multilane link a physical layer packet indicating that the first arbitration and multiplexing logic has changed the third virtual link state.

24. The system of claim 17, wherein the first protocol stack comprises transaction layer and link layer protocols for a Peripheral Component Interconnect Express (PCIe)-based protocol.

* * * * *

UNITED STATES PATENT AND TRADEMARK OFFICE
CERTIFICATE OF CORRECTION

PATENT NO. : 10,776,302 B2
APPLICATION NO. : 16/373472
DATED : September 15, 2020
INVENTOR(S) : Joon Teik Hor et al.

Page 1 of 1

It is certified that error appears in the above-identified patent and that said Letters Patent is hereby corrected as shown below:

In the Claims

In Claim 11, Column 32, Line 11 after the word "first" insert -- virtual --, therefor.

In Claim 12, Column 32, Line 22 after the word "second" insert -- virtual --, therefor.

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*